United States Patent
Suzuki et al.

(10) Patent No.: US 10,486,547 B2
(45) Date of Patent: Nov. 26, 2019

(54) DEVICE AND METHOD FOR CONTROLLING ELECTRIC VEHICLE WITH TORQUE COMMAND AND VIBRATION SUPPRESSION CONTROL

(71) Applicant: HITACHI AUTOMOTIVE SYSTEMS, LTD., Hitachinaka-shi, Ibaraki (JP)

(72) Inventors: Keisuke Suzuki, Kawasaki (JP); Hitoshi Kobayashi, Machida (JP); Tatsuyuki Yamamoto, Isehara (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 328 days.

(21) Appl. No.: 15/021,254

(22) PCT Filed: Sep. 10, 2014

(86) PCT No.: PCT/JP2014/073926
§ 371 (c)(1),
(2) Date: Mar. 10, 2016

(87) PCT Pub. No.: WO2015/037616
PCT Pub. Date: Mar. 19, 2015

(65) Prior Publication Data
US 2016/0221468 A1     Aug. 4, 2016

(30) Foreign Application Priority Data
Sep. 12, 2013   (JP) ................................. 2013-188972

(51) Int. Cl.
*B60L 15/20*    (2006.01)
*B60L 3/10*     (2006.01)
(Continued)

(52) U.S. Cl.
CPC .......... *B60L 15/2009* (2013.01); *B60L 3/106* (2013.01); *B60L 3/108* (2013.01); *B60L 7/14* (2013.01);
(Continued)

(58) Field of Classification Search
None
See application file for complete search history.

(56) References Cited

U.S. PATENT DOCUMENTS

| | | | |
|---|---|---|---|
| 6,264,292 B1 * | 7/2001 | Umeno ................... | B60T 8/172 303/163 |
| 2007/0095585 A1 * | 5/2007 | Imura ...................... | B60K 6/44 180/65.31 |

(Continued)

FOREIGN PATENT DOCUMENTS

| | | |
|---|---|---|
| EP | 1 552 978 A1 | 7/2005 |
| JP | 2000-125410 A | 4/2000 |

(Continued)

*Primary Examiner* — Navid Ziaeianmehdizadeh
(74) *Attorney, Agent, or Firm* — Foley & Lardner LLP

(57) ABSTRACT

Provided are a device for controlling an electric vehicle and a method of controlling an electric vehicle that are capable of appropriately suppressing a vibration. In the device for controlling an electric vehicle according to the present invention, when a motor configured to generate a torque for braking or driving a drive wheel is controlled based on a torque command value based on an accelerator operation or a brake operation by a driver and a vibration suppression control torque command value for suppressing a vibration component caused by a resonance of the vehicle, the vibration suppression control torque command value is restricted based on a state of the drive wheel during a travel.

8 Claims, 15 Drawing Sheets

(51) Int. Cl.
  *B60L 7/14*  (2006.01)
  *B60L 50/51* (2019.01)
  *B60L 58/20* (2019.01)

(52) U.S. Cl.
  CPC .............. *B60L 15/20* (2013.01); *B60L 50/51* (2019.02); *B60L 58/20* (2019.02); *B60L 2210/10* (2013.01); *B60L 2240/12* (2013.01); *B60L 2240/423* (2013.01); *B60L 2240/461* (2013.01); *B60L 2240/465* (2013.01); *B60L 2250/16* (2013.01); *B60L 2250/26* (2013.01); *B60L 2260/26* (2013.01); *B60L 2270/145* (2013.01); *Y02T 10/645* (2013.01); *Y02T 10/7005* (2013.01); *Y02T 10/7066* (2013.01); *Y02T 10/7216* (2013.01); *Y02T 10/7275* (2013.01)

(56) References Cited

U.S. PATENT DOCUMENTS

| | | | | |
|---|---|---|---|---|
| 2008/0126044 | A1* | 5/2008 | Degaki | F02D 41/1497 703/8 |
| 2011/0077835 | A1* | 3/2011 | Otsuka | B60W 10/06 701/99 |
| 2012/0149530 | A1* | 6/2012 | Kim | B60W 10/023 477/176 |
| 2012/0245773 | A1* | 9/2012 | Suzuki | B60L 15/20 701/22 |
| 2013/0226388 | A1 | 8/2013 | Kikuchi et al. | |
| 2013/0316871 | A1* | 11/2013 | Shiiba | B60W 10/08 477/15 |
| 2013/0345917 | A1* | 12/2013 | Ozaki | B60L 15/20 701/22 |
| 2014/0379190 | A1* | 12/2014 | Sawada | B60T 1/10 701/22 |
| 2015/0012160 | A1* | 1/2015 | Tsutsumi | B60L 15/20 701/22 |
| 2015/0142240 | A1 | 5/2015 | Ozaki | |
| 2015/0191089 | A1* | 7/2015 | Yamamoto | B60L 7/18 701/22 |
| 2015/0284005 | A1* | 10/2015 | Suzuki | B60T 8/00 701/22 |
| 2015/0298577 | A1* | 10/2015 | Kobayashi | B60L 15/20 701/22 |
| 2016/0200324 | A1* | 7/2016 | Suzuki | B60L 3/0076 701/22 |

FOREIGN PATENT DOCUMENTS

| | | |
|---|---|---|
| JP | 2006-136177 A | 5/2006 |
| JP | 2009-273328 A | 11/2009 |
| JP | 2013-042599 A | 2/2013 |
| JP | 2013-179728 A | 9/2013 |
| WO | WO-2012/121198 A1 | 9/2012 |

\* cited by examiner

FIG. 16
(a)
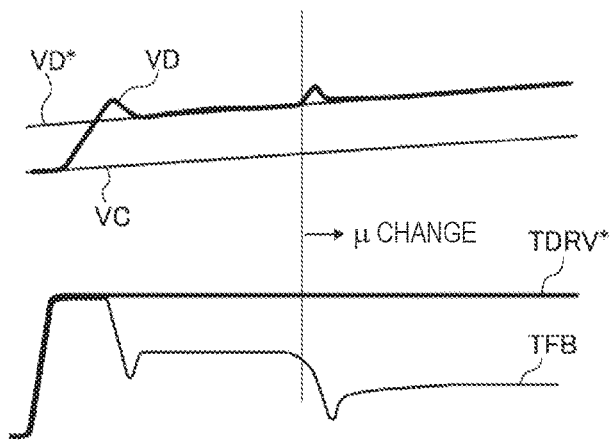
(b)
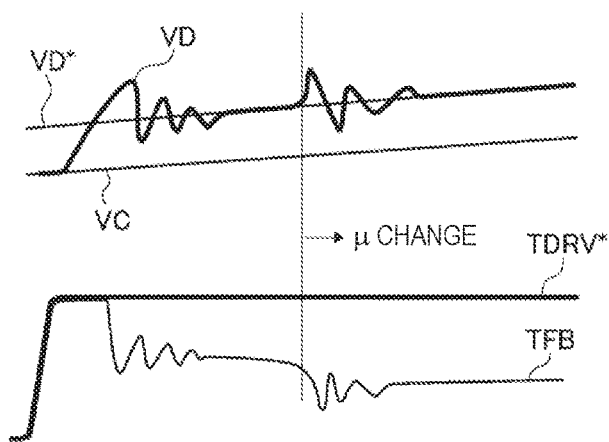
(c)
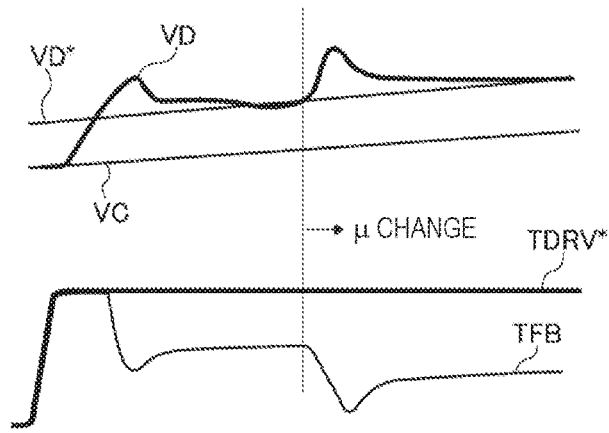

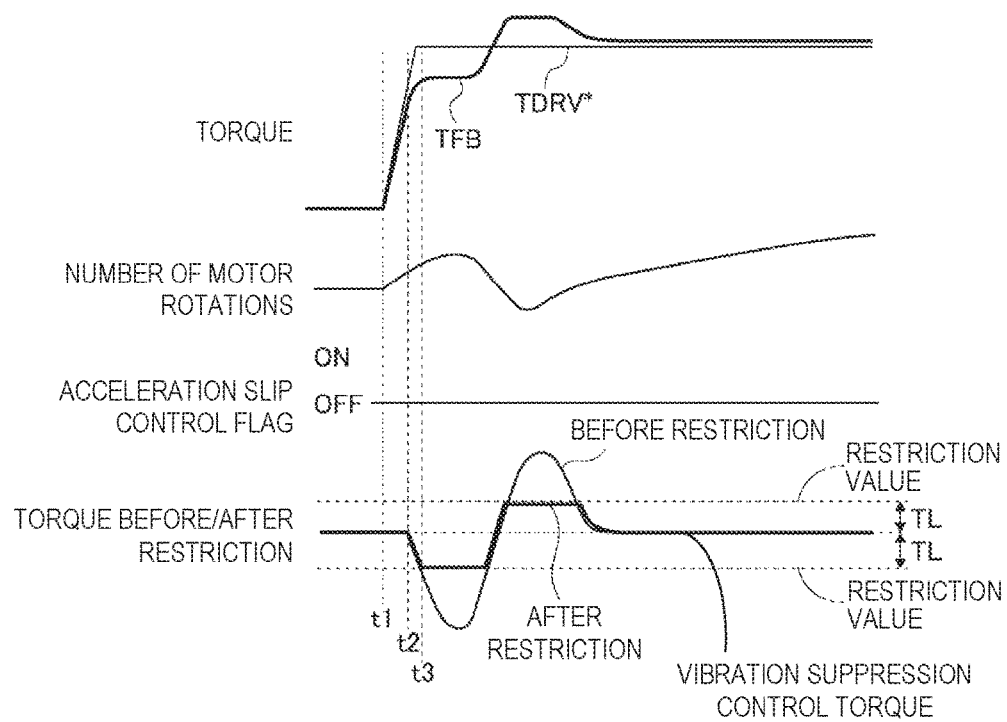

DEVICE AND METHOD FOR CONTROLLING ELECTRIC VEHICLE WITH TORQUE COMMAND AND VIBRATION SUPPRESSION CONTROL

TECHNICAL FIELD

The present invention relates to a device for controlling an electric vehicle.

BACKGROUND ART

Hitherto, a technology described in Patent Literature 1 is known as a device for controlling an electric vehicle. In this vehicle, by calculating a vibration component suppression torque for suppressing a vibration component caused by a resonance of a vehicle, and imposing a predetermined restriction on the vibration component suppression torque, even when a noise is superimposed on the number of rotation to indicate a peculiar value, stabilization of control is achieved.

CITATION LIST

Patent Literature

PTL 1: JP 2000-125410 A

SUMMARY OF INVENTION

Technical Problem

However, when the restriction is imposed as described above, the configuration is made so that the restriction value is fixed in advance, or the restriction value is changed but is changed depending on a vehicle speed. For example, when the predetermined restriction is large, the torque may excessively be suppressed, and there is such a fear that a degradation in a travel start property may be caused. On the other hand, when the predetermined restriction is small, there arises such a problem that a sufficient vibration component suppression torque cannot be applied, and the suppression of the vibration is difficult when the vibration is generated.

The present invention has been made in view of the above-mentioned problems, and therefore has an object to provide a device for controlling an electric vehicle and a method of controlling an electric vehicle that are capable of appropriately suppressing the vibration.

Solution to Problem

In order to attain the above-mentioned object, in a device for controlling an electric vehicle according to one embodiment of the present invention, when a motor configured to generate a torque for braking or driving a drive wheel is controlled based on a torque command value based on an accelerator operation or a brake operation by a driver and a vibration suppression control torque command value for suppressing a vibration component caused by a resonance of the vehicle, the vibration suppression control torque command value is restricted based on a state of the drive wheel during a travel.

BRIEF DESCRIPTION OF DRAWINGS

FIG. 16 is time charts for illustrating a relationship between the number of rotations and a torque when drive slip control is carried out.

FIG. 18 is a table for showing set values for a vibration suppression control torque restriction value according to the first embodiment.

FIG. 19 is a time chart at the time of start when TL is set as the vibration suppression control torque restriction value according to the first embodiment.

DESCRIPTION OF EMBODIMENTS

[First Embodiment]

Figure 1:
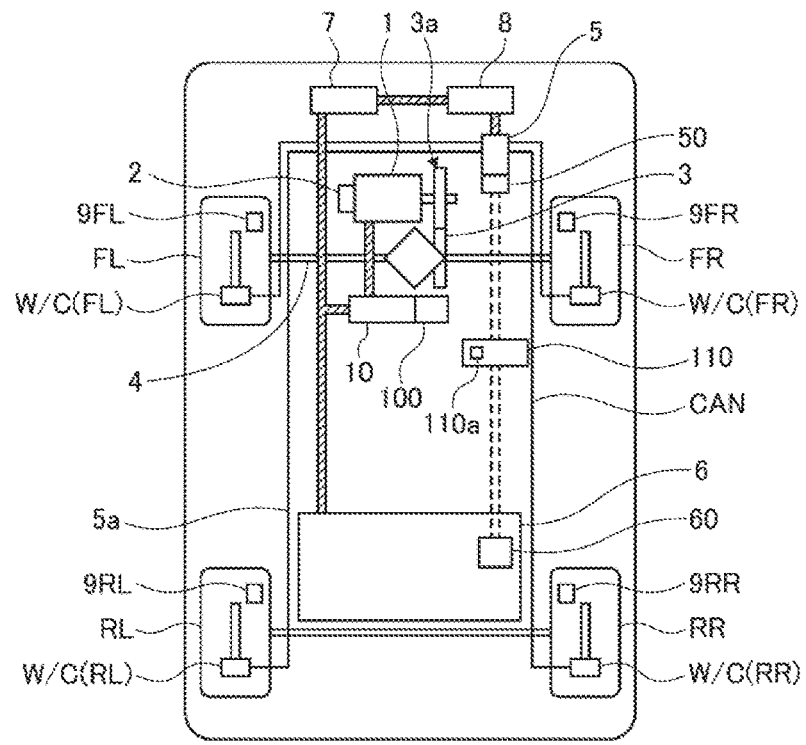
FIG. 1 is a system diagram for illustrating a configuration of an electric vehicle according to a first embodiment of the present invention.

FIG. 1 is a system diagram for illustrating a configuration of an electric vehicle according to a first embodiment of the present invention. The electric vehicle is a front wheel drive vehicle, and includes front wheels FL and FR, which are drive wheels, and rear wheels RL and RR, which are driven wheels. On each of the wheels, a wheel cylinder W/C(FL), W/C(FR), W/C(RL), or W/C(RR) (also simply referred to as W/C), which is configured to generate a friction braking force by pressing a brake pad to a brake rotor configured to integrally rotate with a tire, and a wheel speed sensor 9(FL), 9(FR), 9(RL), or 9(RR) (also simply referred to as 9), which is configured to detect a wheel speed of each wheel, are provided. To the wheel cylinder W/C, a hydraulic unit 5 is connected via a hydraulic pipe 5a.

The hydraulic unit 5 includes a plurality of solenoid valves, a reservoir, a pump motor, and a brake controller 50, and is configured to control, based on a command from the brake controller 50, drive states of the various solenoid valves and the pump motor, thereby controlling wheel cylinder hydraulic pressures for the respective wheels. Note that, the hydraulic unit 5 may be a widely known brake-by-wire unit, or a brake unit including a hydraulic circuit capable of carrying out vehicle stability control, and is thus not limited.

On an electric motor 1, which is a drive source, a resolver 2 configured to detect a motor rotational angle is provided. To the electric motor 1, a differential gear 3 is connected via a speed reduction mechanism 3a, and, to a drive shaft 4 connected to the differential gear 3, the front wheels FL and FR are connected. On a rear part of the vehicle, a high-voltage battery 6 configured to supply an electric power for driving to the electric motor 1, or recover a regenerative electric power, and a battery controller 60 configured to monitor and control a battery state of the high-voltage battery 6 are mounted. An inverter 10 interposed between the high-voltage battery 6 and the electric motor 1 is controlled by a motor controller 100. Moreover, to the high-voltage battery 6, an accessory battery 8 is connected via a DC-DC converter 7 (component), and the accessory battery 8 functions as a power supply for driving of the hydraulic unit 5.

On the electric vehicle according to the first embodiment, a CAN communication line is provided, which is an onboard communication line to which a plurality of controllers installed on the vehicle are connected. The brake controller 50, a vehicle controller 110, the battery controller 60, and the like are connected for mutual information communication. Note that, a power steering controller 20 configured to control a power steering device configured to assist a steering operation by a driver and a meter controller 22 configured to control a speedometer configured to indicate a vehicle speed, which are not shown in FIG. 1, are connected to the CAN communication line. Moreover, on the power steering controller 20, a steering angle sensor 21 configured to detect a steering angle of a steering wheel is provided.

Figure 2:
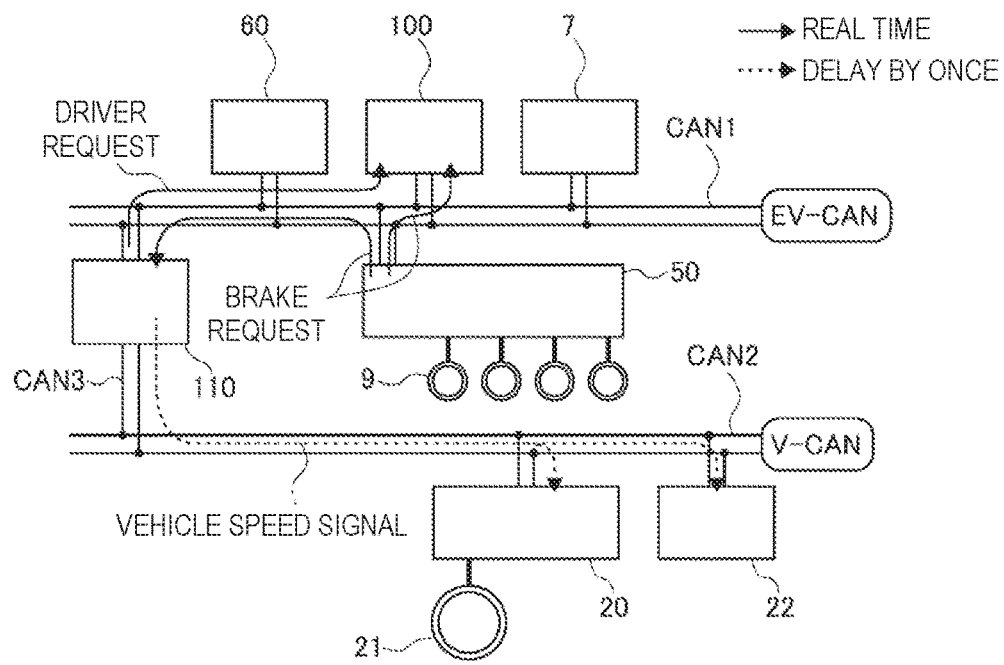
FIG. 2 is a schematic diagram for illustrating a connection state among various controllers according to the first embodiment.

FIG. 2 is a schematic diagram for illustrating a connection state of the various controllers according to the first embodiment. In the electric vehicle according to the first embodiment, the battery controller 60, the motor controller 100, the DC-DC converter 7, and the brake controller 50, which are configured to control a torque state acting between each of the drive wheels and the road surface, are grouped into a powertrain system, and are connected to a first CAN bus CAN1 (first communication device). Moreover, a chassis system including the power steering controller 20 and the meter controller 22 is connected to a second CAN bus CAN2 (second communication device).

The first CAN bus CAN1 and the second CAN bus CAN2 are connected with each other via a connection bus CAN3. On the connection bus CAN3, the vehicle controller 110 is provided, and information transmitted or received on the first CAN bus CAN1 is received by the vehicle controller 110 on the connection bus CAN3, and is then output to the second CAN bus CAN2. Similarly, information transmitted or received on the second CAN bus CAN2 is received by the vehicle controller 110 on the connection bus CAN3, and is then output to the first CAN bus CAN1.

(Connection Configuration of Controllers)

Figure 3:
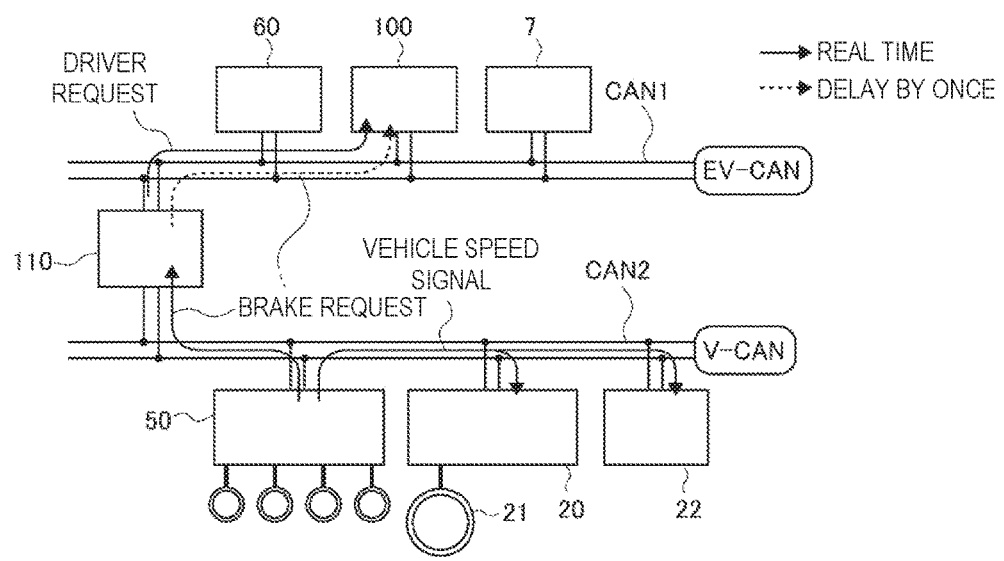
FIG. 3 is a schematic diagram for illustrating a connection state among various controllers according to a comparative example.

A description is now given of a reason for the configuration of the connection relationship among the controllers in comparison with a schematic diagram for illustrating the connection state of a comparative example. FIG. 3 is a schematic diagram for illustrating the connection state among the various controllers according to the comparative example. Hitherto, when a control system for a vehicle is constructed, as illustrated in FIG. 3, the brake controller 50 is connected to the second CAN bus CAN2. This is because, hitherto, the control for the brake system is included in control for the chassis system, and is thus not considered to be included in control for the powertrain system. For example, in terms of an increase in efficiency of a vehicle development, the respective systems such as the powertrain system, the brake system, a steering system, and a suspension system are often respectively developed as individual systems. When these individually developed systems are unified as an overall vehicle system, the unification is carried out by connection to a CAN communication line. The CAN communication line is limited in the number of controllers that can be connected, but can easily connect a plurality of controllers to be grouped. Thus, in the conventional system, the controllers are divided into a group in which the controllers in the chassis system are connected as a whole and a group in which the controllers in the powertrain system are connected as a whole, and, on the connection bus configured to connect between the respective groups, the vehicle controller is provided so as to control the entire vehicle.

On this occasion, in the configuration of the comparative example, a sufficient travel performance is hard to be secured in some cases. For example, at the time of vehicle start, when a driver excessively depresses an accelerator pedal and a large torque is output, a drive slip may be generated. In order to suppress the drive slip, the brake controller 50 requests the vehicle controller 110 to suppress the slip state. Then, the vehicle controller 110 outputs a request such as a torque decrease to the motor controller 100 based on the request received from the brake controller 50.

However, such processing that the information sent on the second CAN bus CAN2 is once received by the vehicle controller 110, and then is sent on the first CAN bus CAN1 is carried out. Therefore, the brake request output from the brake controller 50 is output to the motor controller 100 at a communication timing delayed by once. The delay is thus generated to cause a state in which the drive slip cannot be effectively suppressed. Particularly when the drive wheel slips, an inertia of the drive wheel is extremely less than an inertia of the vehicle, and a rotation state thus tends to abruptly change accordingly. Moreover, it is conceivable to increase a control gain or a communication speed, but the CAN communication line is designed so as to easily connect various additional systems. Therefore, even when the control gain and the control cycle of only the brake controller are increased, a limit is imposed by a communication speed on the CAN communication line, and it is thus difficult to secure a sufficient responsiveness.

Thus, according to the first embodiment, from such a viewpoint that the brake controller 50 is a system configured to control the torque between the drive wheel and the road surface, the brake controller 50 is included in the powertrain system, and is connected to the first CAN communication line CAN1. In this case, the vehicle speed information and the like output from the brake controller 50 are slightly delayed in the timing to transmit to the second CAN bus CAN2, but the vehicle speed does not change abruptly due to the magnitude of the inertia of the vehicle, and there poses no problem.

(Problem Specific to Electric Vehicle)

A description is now given of a problem specific to the electric vehicle. Hitherto, in a vehicle system configured to use wheel speed data to control the powertrain system including an internal combustion engine, the wheel speed data and the torque decrease request are often received from the brake controller 50, and are used. The reason is as follows. Even if control for the internal combustion engine is devised, responsiveness to actually reflect to an output torque is limited, and the responsiveness of the CAN communication line thus rarely poses a problem as a bottleneck in responsiveness required in development of the powertrain. Thus, when the torque decrease request and the wheel speed data are used in the development of the powertrain, the wheel speed detection performance cultivated in the development of the brake system is often directly used for the control. This basic design idea is actually often followed also in the development of the electric vehicle.

On the other hand, on the electric vehicle in which the electric motor 1 is connected to the drive wheels, the responsiveness of the torque control is much better than that of the internal combustion engine, and more precise drive wheel slip control can be carried out. In order to attain control taking advantage of the good responsiveness of the electric motor 1, the responsiveness of the CAN communication line has come to pose a problem. Based on this background, in order to build a system taking advantage of the high responsiveness of the electric motor 1, such a system that the wheel speed data is not received from the brake controller 50 as secondary information, but is received as primary information to calculate a control amount needs to be built.

Moreover, it is important for the vehicle controller 110 configured to control the entire vehicle to monitor and control the entirety, but if such an excessive centralization that, after all information is gathered, all commands are issued to the respective controllers is carried out, a calculation load on the vehicle controller 110 increases, and an extremely expensive controller is necessary. Moreover, the vehicle controller 110 also considers information on a low communication speed, and then outputs a command, and thus, even if an expensive vehicle controller 110 is employed, a vehicle system good in the responsiveness cannot be built. Moreover, it is conceivable to transmit or receive all information quickly, but an increase in a communication speed is a specification change influencing all other controllers connected to this communication line, and it is very difficult to increase the entire communication speed in a complex system.

Thus, according to the first embodiment, the configuration of the CAN communication line is divided into the first CAN bus CAN1 and the second CAN bus CAN2. In addition, such a configuration that the vehicle controller 110 does not output all the commands, but controllers on levels lower than the vehicle controller 110 make determinations and carry out control to some extent is constructed. Specifically, in order to enable determination of a final motor torque command value in the motor controller 100 by priority over the vehicle controller 110, such a configuration that the brake request output from the brake controller 50 can directly be transmitted to the motor controller 100 is provided. Further, such a configuration that the motor controller 100 can read, in addition to the normal torque request from the vehicle controller 110, the brake request from the brake controller 50, and can output the final motor torque command value depending on the travel state is provided.

(Information Transmitted or Received by Controllers)

Figure 4:
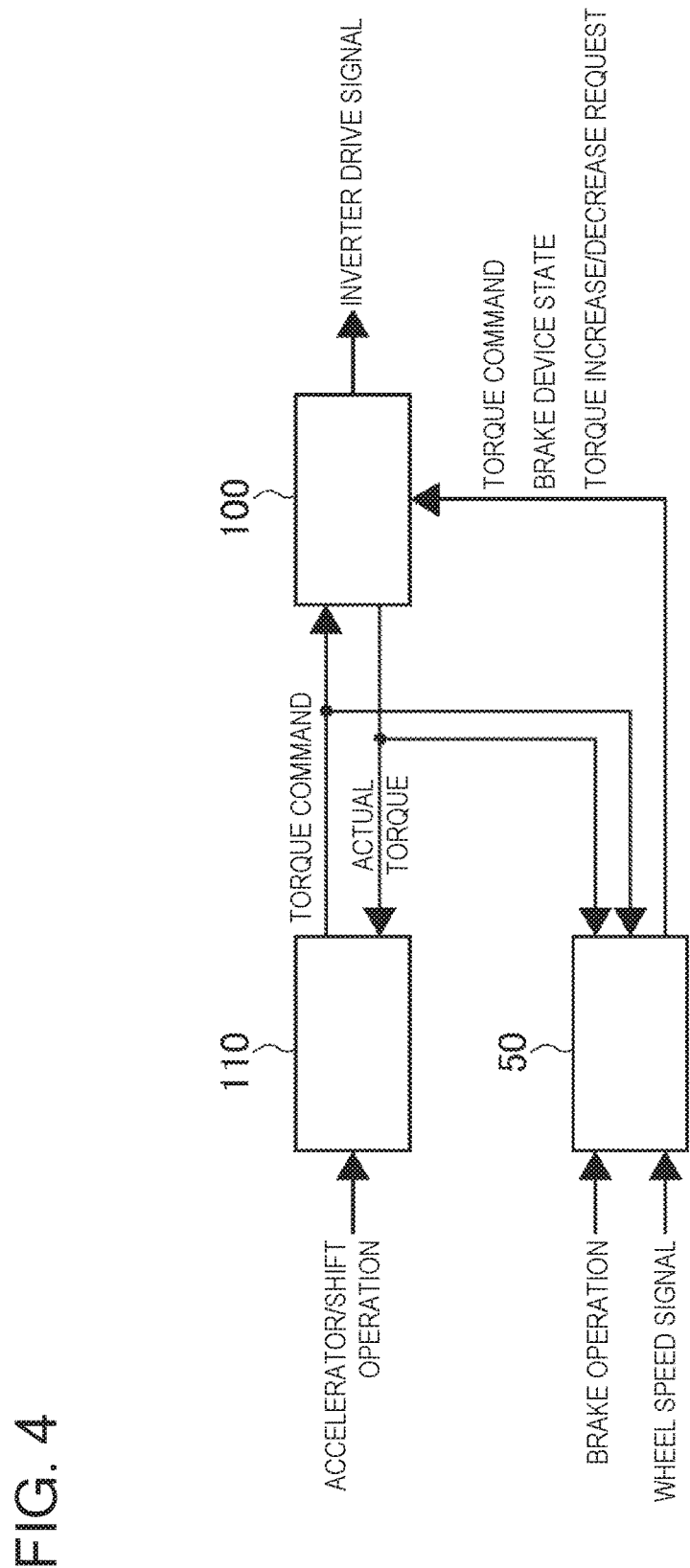
FIG. 4 is a control block diagram for illustrating contents of information to be transmitted or received by the respective controllers according to the first embodiment.

FIG. 4 is a control block diagram for illustrating contents of information to be transmitted or received by the respective controllers according to the first embodiment. The vehicle controller 110 inputs accelerator pedal position information and shift position information, calculates a first torque command value based on a basic driver request torque and other results of control processing, and outputs the first torque command value to the motor controller 100 and the brake controller 50. The brake controller 50 inputs an on/off state of a brake switch representing a brake pedal operation state and a wheel speed signal of each wheel, and outputs, for example, a second torque command value based on a request from a traction control, a brake device state representing whether or not the hydraulic unit 5 and the brake controller 50 are normally operating, and a torque increase/decrease request such as an increase, a decrease, or no increase/decrease in response to a driver request.

In the motor controller 100, when the brake device state is normal, and when a result of a comparison between the first torque command value and the second value command value matches the torque increase/decrease request, the second torque command value from the brake controller 50 is employed, and when these conditions are not satisfied, the first torque command value is employed. As a result of these determinations, even if a problem such as a communication failure occurs, the motor controller 100 is prevented from operating against the intentions of the driver and the brake controller 50.

(Details of Control in Controllers)

Figure 5:
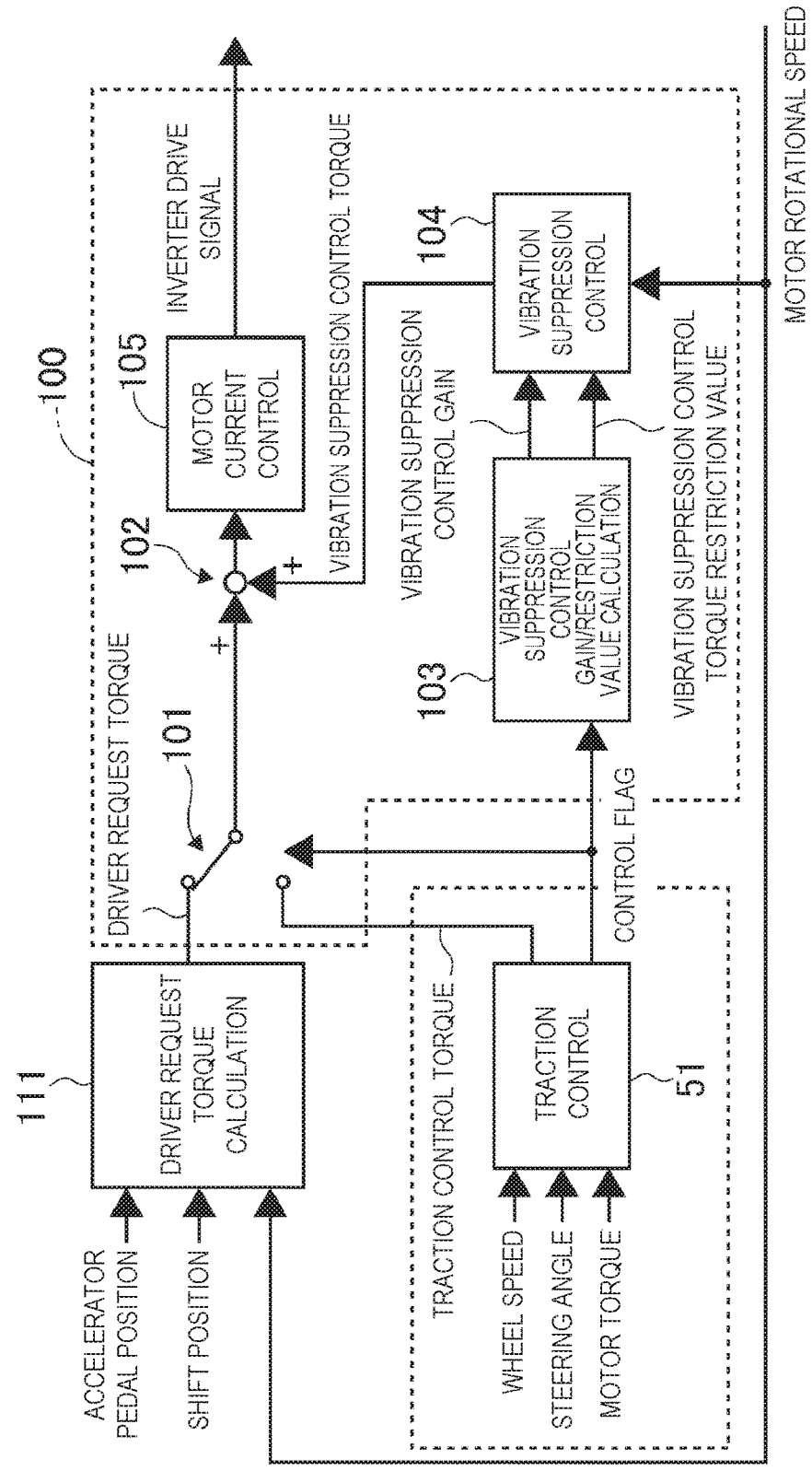
FIG. 5 is a control block diagram for illustrating a request of each of a vehicle controller and a traction control provided in a brake controller, and a control content to be carried out by a motor controller according to the first embodiment.

FIG. 5 is a control block diagram for illustrating a request of each of the vehicle controller and the traction control provided in the brake controller, and a control content to be carried out by the motor controller according to the first embodiment. In FIG. 5, a specialized description is given of the content of the traction control. A driver request torque command value calculation unit 111 in the vehicle controller 110 calculates the driver request torque (first torque command value) based on an accelerator pedal opening degree and a shift position, and outputs the driver request torque to the motor controller 100. A traction control unit 51 in the brake controller 50 inputs the wheel speed information from the wheel speed sensors 9, the steering angle information from the steering angle sensor, and an actual motor torque output by the electric motor 1. Then, the traction control unit 51 determines whether or not the drive wheel is in the drive slip state. When the drive wheel is in the drive slip state, the traction control unit 51 outputs the traction control torque (second torque command value) for suppressing the drive slip, and outputs a control flag representing the control content carried out in the brake controller 50 to the motor controller 100.

The motor controller 100 includes a changeover switch 101 configured to switch, based on the control flag, the command value to be selected between the driver request torque and the traction control torque, a torque addition unit 102 configured to add a vibration suppression control torque to be described later to a switched torque command value TMCIN*, thereby outputting a final torque command value, a motor current control unit 105 configured to output an inverter drive signal to the inverter 10 in order to control the current to be supplied to the electric motor 1 based on the final torque command value, a vibration suppression control information calculation unit 103 configured to calculate a vibration suppression control gain and a vibration suppression control restriction value for suppressing a vibration of a drive system to be generated in the powertrain system, and a vibration suppression control unit 104 configured to apply high-pass filtering to the calculated vibration suppression control information and the motor rotational speed to detect a high-frequency component, and calculate, based on the detected high-frequency component, a vibration suppression control torque for suppressing the vibration of the powertrain system. Note that, the high-pass filter is employed in the first embodiment, but an observer may be used for estimation.

Figure 6:
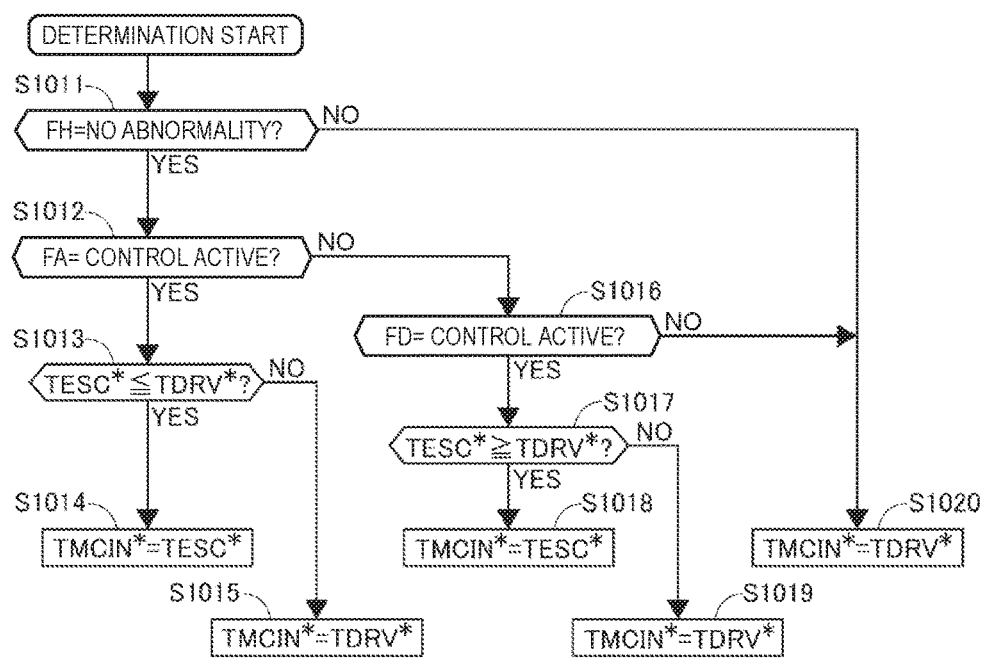
FIG. 6 is a flowchart for illustrating command value selection processing according to the first embodiment.

FIG. 6 is a flowchart for illustrating the command value selection processing according to the first embodiment. In the changeover switch 101, as a result of the following determination processing, any one of a driver request torque command value TDRV* and a slip control torque command value TESC* is output as the torque command value TMCIN*. Note that, in the brake controller 50, an acceleration slip control flag FA and a deceleration slip control flag FD representing a slip control state are provided in the traction control unit 51, and further, an ESC state flag FH representing an abnormal state of the hydraulic unit 5 or the brake controller 50 itself is provided. In Step S1011, it is determined whether or not the ESC state flag FH represents a no abnormality state. When there is no abnormality, the processing proceeds to Step S1012, and, when there is an abnormality, the processing proceeds to Step S1020 so as not to select the command from the brake controller 50, but switch from the torque command value TMCIN* to the driver request torque command value TDRV*.

In Step S1012, it is determined whether or not the acceleration slip control flag FA represents that the control is active. When the control is active, the processing proceeds to Step S1013, and when the control is inactive, the processing proceeds to Step S1016. In Step S1013, it is determined whether or not the slip control torque command value TESC* is equal to or less than the driver request torque command value TDRV*. When the slip control torque command value TESC* is equal to or less than the driver request torque command value TDRV*, the processing proceeds to Step S1014 so as to switch from the torque command value TMCIN* to the slip control torque command value TESC*. In other words, during the acceleration slip control, the torque decrease should be applied to the driver request torque command value TDRV*, and when the slip control torque command value TESC* is equal to or less than the driver request torque command value TDRV*, the lower torque needs to be selected to suppress the slip. On the other hand, even during the acceleration slip control, when the slip control torque command value TESC* is more than the driver request torque command value TDRV*, the acceleration slip tends to be promoted, and, in this case, the processing proceeds to Step S1015 so as to switch the torque command value TMCIN* to the driver request torque command value TDRV*.

In Step S1016, it is determined whether or not the deceleration slip control flag FD represents that the control is active. When the control is active, the processing proceeds to Step S1017, and when the control is inactive, the processing proceeds to Step S1020. In Step S1017, it is determined whether or not the slip control torque command value TESC* is equal to or more than the driver request torque command value TDRV*. When the slip control torque command value TESC* is equal to or more than the driver request torque command value TDRV*, the processing proceeds to Step S1018 so as to switch from the torque command value TMCIN* to the slip control torque command value TESC*. In other words, during the deceleration slip control, as a result of generation of a regenerative torque as the driver request torque command value TDRV*, a slip is generated, and when, in order to increase the torque to eliminate this slip, the slip control torque command value TESC* is equal to or more than the driver request torque command value TDRV*, appropriate control is considered to be carried out. On the other hand, even during the deceleration slip control, when the slip control torque command value TESC* is less than the driver request torque command value TDRV*, the deceleration slip tends to be promoted, and, in this case, the processing proceeds to Step S1019 so as to switch from the torque command value TMCIN* to the driver request torque command value TDRV*.

Figure 7:
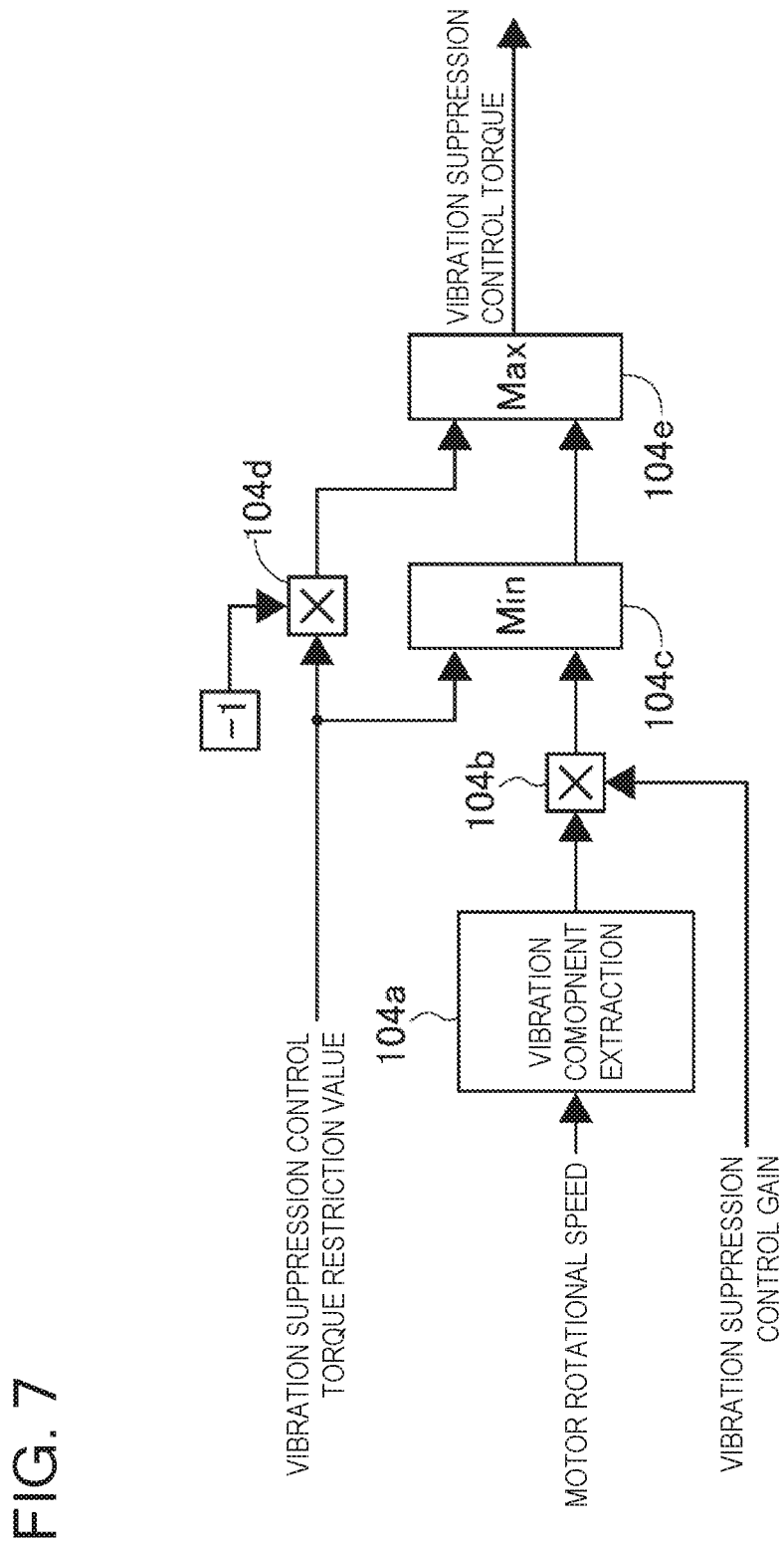
FIG. 7 is a control block diagram for illustrating vibration suppression control torque command value calculation processing according to the first embodiment.

FIG. 7 is a control block diagram for illustrating vibration suppression control torque command value calculation processing according to the first embodiment. The vibration suppression control unit 104 includes a vibration component extraction unit 104*a* configured to extract a vibration component from the motor rotational speed. The vibration component extraction unit 104*a* is constructed by a high-pass filter, and passes only a predetermined high-frequency component. A gain multiplication unit 104*b* multiplies the vibration component that has passed through the high-pass filter by a vibration control gain. A torque restriction unit 104*c* compares magnitudes of the vibration suppression control torque restriction value and the vibration suppression control torque after the gain multiplication with each other, and selects a smaller one. A negative value multiplication unit 104*d* multiplies the vibration suppression control torque restriction value by a negative value. A torque restriction unit 104*e* compares magnitudes of a negative value of the vibration suppression control torque restriction value and the vibration suppression control torque selected by the torque restriction unit 104*c*, with each other, and selects a larger one. As a result, the vibration suppression control torque corresponding to the vibration component is calculated, and generation of an excessive vibration suppression control torque is suppressed.

(Slip Control)

Figure 8:
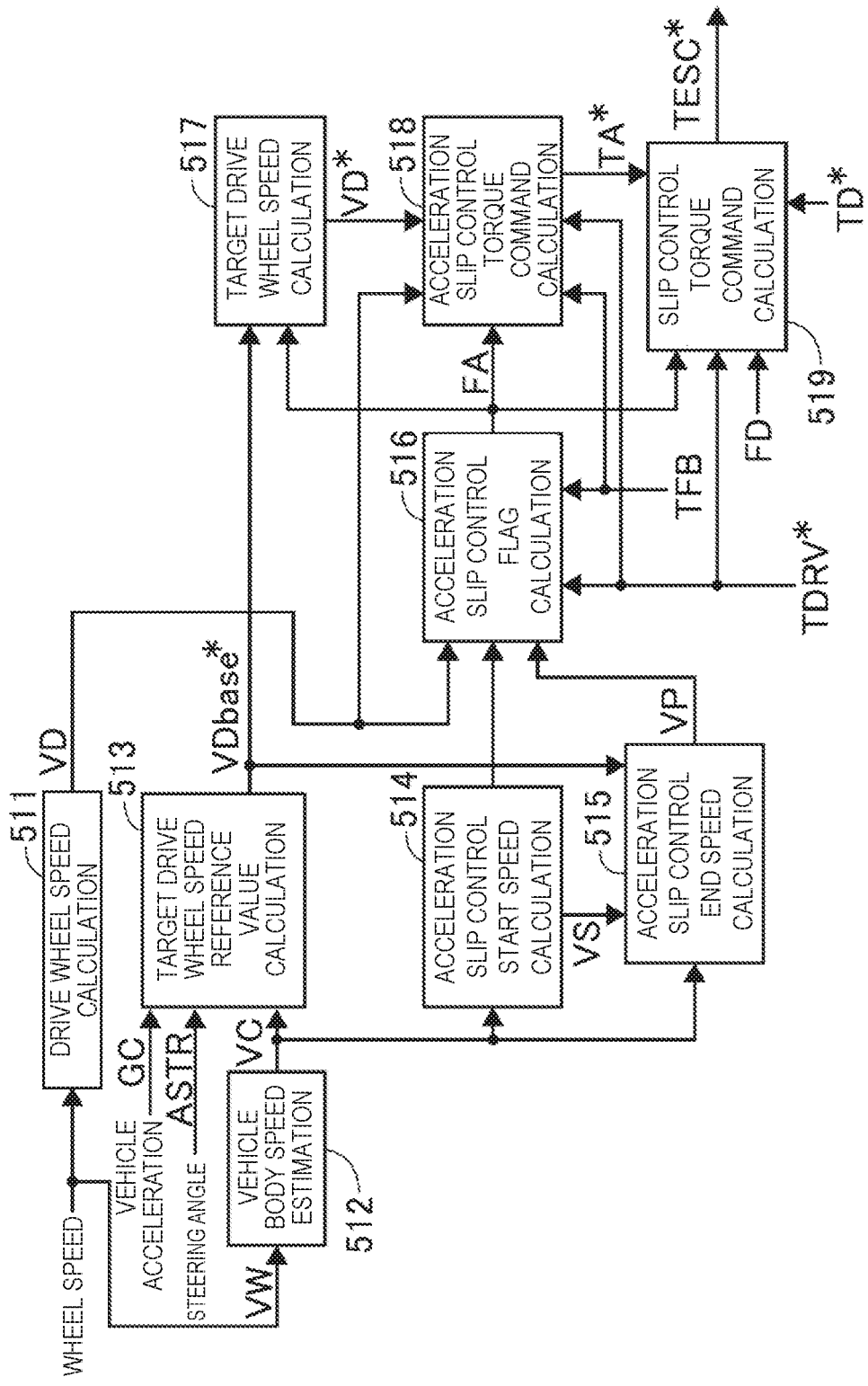
FIG. 8 is a control block diagram for illustrating slip control to be carried out by a traction control unit according to the first embodiment.

FIG. 8 is a control block diagram for illustrating slip control to be carried out by the traction control unit according to the first embodiment. A drive wheel speed calculation unit 511 calculates a drive wheel speed VD based on detected wheel speeds VW. A vehicle body speed estimation unit 512 calculates an estimated vehicle body speed VC based on the wheel speeds VW. For example, the vehicle body speed may be estimated based on an average of vehicle body speeds calculated from the wheel speeds of the respective driven wheels, may be an average of vehicle body speeds calculated from the wheel speeds of the respective four wheels, or may be the select-low of the driven wheels and drive wheels (acquiring the vehicle body speed by selecting a lower one of the wheel speeds of the driven wheels and the drive wheels), and thus there is no particular limitation. Moreover, the traction control unit includes a vehicle body acceleration detection unit configured to detect a vehicle body acceleration GC. This detection unit may be a G sensor configured to detect a longitudinal acceleration, or may use a derivative of the estimated vehicle body speed VC as the vehicle body acceleration GC, and is thus not particularly limited.

(Target Drive Wheel Speed Reference Value Calculation Processing)

Figure 9:
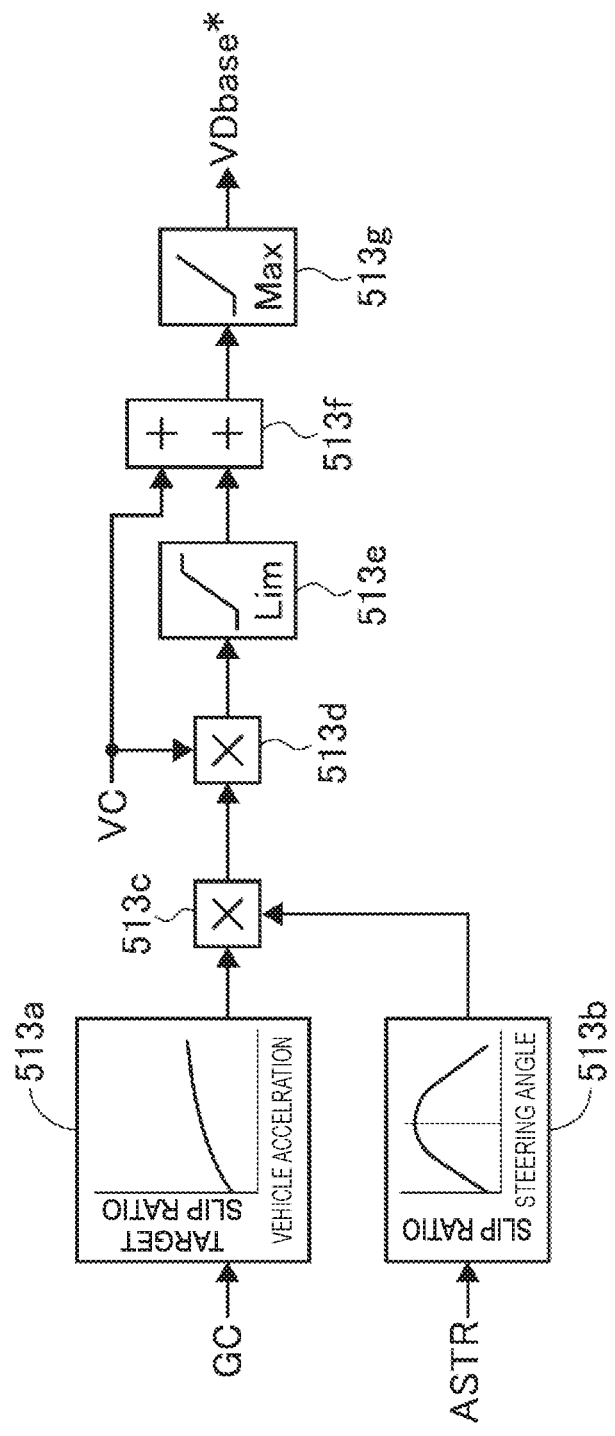
FIG. 9 is a control block diagram for illustrating target drive wheel speed reference value calculation processing according to the first embodiment.

A target drive wheel speed reference value calculation unit 513 calculates a target drive wheel speed reference value VDbase*, which is a target speed of each of the drive wheels, based on the vehicle body acceleration GC, a steering angle Astr, and the estimated vehicle body speed VC. FIG. 9 is a control block diagram for illustrating target drive wheel speed reference value calculation processing according to the first embodiment. An acceleration target slip ratio gain calculation unit 513a includes an acceleration target slip ratio gain map, and is set so as to calculate a larger acceleration target slip ratio gain as the detected acceleration GC increases. In other words, when a large acceleration is acquired, a friction force between the drive wheel and the road surface is considered to be secured even when a certain slip ratio is permitted. A steering angle target slip ratio gain calculation unit 513b includes a steering angle target slip ratio gain map, and is configured to calculate a larger steering angle target slip ratio gain when the detected steering angle is close to a neutral position, and calculate a smaller steering angle target slip ratio gain as the steering angle represents a larger steering state. in other words, in a straight travel state, less cornering force is necessary, and hence a large force is used in a longitudinal direction of a friction circle of the tire, while, in a steering state, a cornering force is necessary, and hence less force is used in the longitudinal direction of the friction circle of the tire and a force in a lateral direction is secured.

A slip ratio calculation unit 513c multiples the acceleration target slip ratio gain and the steering angle target slip ratio gain by each other, thereby calculating a target slip ratio reflecting both the states. A target slip amount calculation unit 513d multiples the calculated target slip ratio by the estimated vehicle body speed VC so as to calculate a target slip amount. A limiter processing unit 513e applies limit processing to the target slip amount so as to suppress an abrupt change in the target value. An addition unit 513f adds the target slip amount to the estimated vehicle body speed VC, thereby calculating a target drive wheel speed VD*. A limiter processing unit 513g applies limiter processing to the target drive wheel speed VD*, thereby calculating the target drive wheel speed reference value VDbase*. Note that, when a yaw rate sensor is provided, the following control may be carried out. That is, a yaw rate sensor value and an estimated yaw rate calculated from the steering angle and the estimated vehicle body speed VC may be compared with each other, and when a difference therebetween is large, the target slip ratio and the torque command value may be corrected to suppress the difference between the yaw rate sensor value and the estimated yaw rate.

(Acceleration Slip Control Start Speed Calculation Processing)

Figure 13:
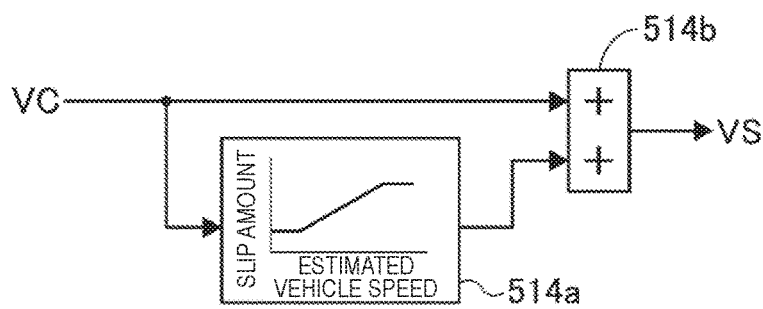
FIG. 13 is a control block diagram for illustrating acceleration slip control start speed calculation processing according to the first embodiment.

An acceleration slip control start speed calculation unit 514 calculates a control start speed VS based on the estimated vehicle body speed VC. FIG. 13 is a control block diagram for illustrating acceleration slip control start speed calculation processing according to the first embodiment. In a control start slip amount map 514a, as the estimated vehicle body speed VC increases, a larger slip amount is calculated. This is because, in terms of the slip ratio, a control start slip ratio is set to be approximately constant. Note that, in a low vehicle speed state including a start state, the calculation of the slip ratio is difficult, and the map 514a sets a constant slip amount. Then, an addition unit 514b adds the slip amount calculated from the control start slip amount map 514a to the estimated vehicle body speed VC, thereby calculating the control start speed VS.

(Acceleration Slip Control End Speed Calculation Processing)

Figure 14:
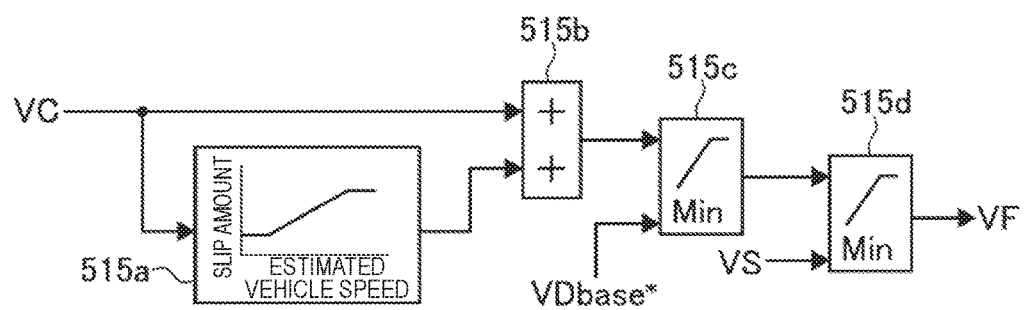
FIG. 14 is a control block diagram for illustrating acceleration slip control end speed calculation processing according to the first embodiment.

An acceleration slip control end speed calculation unit 515 calculates a control end speed VF based on the estimated vehicle body speed VC. FIG. 14 is a control block diagram for illustrating acceleration slip control end speed calculation processing according to the first embodiment. In a control end slip amount map 515a, as the estimated vehicle body speed VC increases, a larger slip amount is calculated. Note that, when the control end speed VF is set, in terms of avoidance of a control hunting, for the same estimated vehicle body speed VC, the slip amount set in the control end slip amount map 515a is set smaller than the slip amount set in the control start slip amount map 514a. Then, an addition unit 515b adds the slip amount calculated from the control end slip amount map 515a to the estimated vehicle body speed VC, thereby calculating a control end speed calculation value. Then, a first selection unit 515c selects smaller one of the control end speed calculation value and the target drive wheel speed reference value VDbase* so that the control end speed VF is set closer to the estimated vehicle body speed VC than to the target drive wheel speed reference value VDbase*, thereby preventing the hunting. Similarly, a second selection unit 515d selects smaller one of the selected value in the first selection unit 515c and the control start speed VS so that the control end speed VF is set closer to the estimated vehicle body speed VC than to the control start speed VS, thereby preventing the hunting. Then, the finally selected value is output as the control end speed VF.

(Acceleration Slip Control Flag Calculation Processing)

Figure 15:
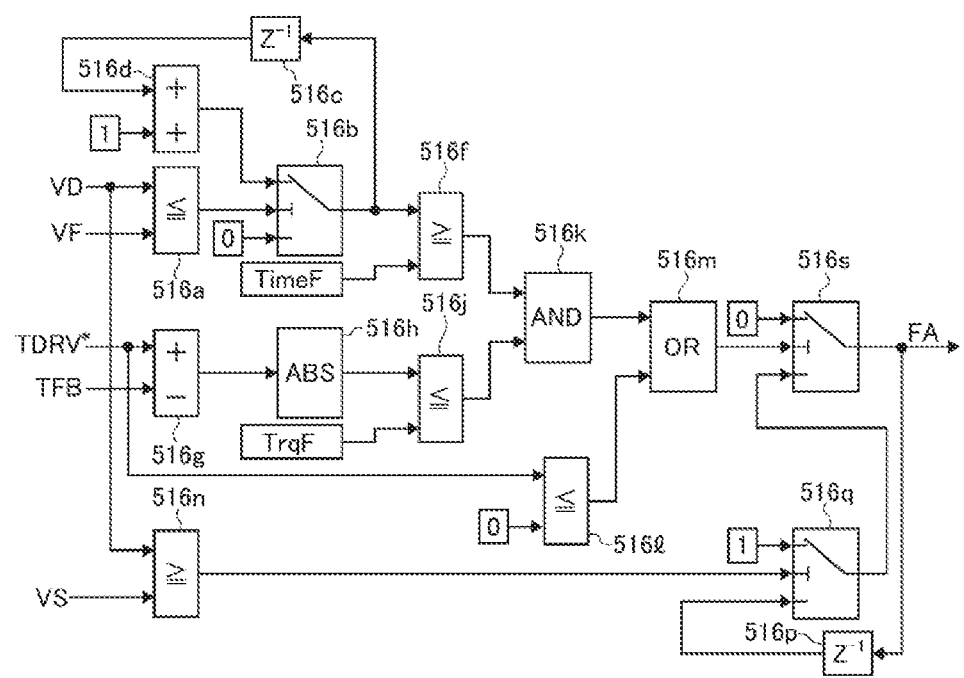
FIG. 15 is a control block diagram for illustrating acceleration slip control flag calculation processing according to the first embodiment.

An acceleration slip control flag calculation unit 516 determines, based on the state of the drive wheels, whether or not to carry out acceleration slip control. When the acceleration slip control is carried out, the acceleration slip control flag calculation unit 516 outputs the acceleration slip control flag FA set to ON, and, when the acceleration slip control is not carried out, the acceleration slip control flag calculation unit 516 outputs the acceleration slip control flag FA set to OFF. FIG. 15 is a control block diagram for illustrating acceleration slip control flag calculation processing according to the first embodiment. Note that, FIG. 15 is a diagram for illustrating a case in which a shift lever is at a D range, but basically the same processing is carried out for other shift ranges.

A control end determination unit 516a compares the drive wheel speed VD and the control end speed VF with each other, and, when the drive wheel speed VD is equal to or less than the control end speed VF, outputs a switch signal to an end side first switch 516b. The end side first switch 516b is a switch configured to switch between 0 and a counter value constructed by a previous value output unit 516c and a count-up unit 516d. When the switch signal is received from the control end determination unit 516a in a state in which 0 is selected during the drive slip control, the end side first switch 516b starts count up through the previous value output unit 516c and the count-up unit 516d, and outputs a count to a control end delay determination unit 516f. When the value output from the end side first switch 516b is equal to or more than a timer value TimeF set in advance, the control end delay determination unit 516f outputs a signal representing a state in which one of control end conditions is satisfied to an AND condition determination unit 516k. In other words, the control end delay determination unit 516f determines whether or not a period equal to or longer than TimeF has elapsed after the drive wheel speed VD becomes equal to or less than the control end speed VF, and when the period has elapsed, the control end delay determination unit 516f outputs the signal representing the state in which one of control end conditions is satisfied.

A torque deviation calculation unit 516g calculates a torque deviation between the driver request torque command value TDRV* and a final torque command value TFB directed to the electric motor 1, and outputs an absolute value thereof acquired by an absolute value processing unit 516h to a torque state determination unit 516j. When the torque deviation is equal to or less than a predetermined torque value TrqF set in advance, the torque state determination unit 516j outputs a signal representing a state in which one of the control end conditions is satisfied.

When the condition for the end determination and the delay processing based on the drive wheel speed VD is satisfied, and when such a condition that the driver request torque command value TDRV* approximately matches the torque instructed to the electric motor 1 is satisfied, the AND condition determination unit 516k outputs a control end condition satisfaction signal to an OR condition determination unit 516m. Moreover, when the driver request torque command value TRDV* is equal to or less than 0, a negative value determination unit 516l outputs a control end condition satisfaction signal. When any one of the AND condition determination unit 516k and the negative value determination unit 516l outputs the control end condition satisfaction signal, the OR condition determination unit 516m outputs a switch signal to a control flag switch 516s.

A control start determination unit 516n compares the drive wheel speed VD and the control start speed VS with each other, and, when the drive wheel speed VD is equal to or more than the control start speed VS, outputs a switch signal to a start side switch 516q, thereby outputting 1. Upon the control start determination, the slip of the drive wheel is increasing, and the control thus needs to be quickly started. Thus, the slip control is quickly started without a delay period or the like. When a signal of a control flag previous value output unit 516p, which is the previous value of the control flag switch 516s, is input to the start side switch 516q, and the start side switch 516q outputs 1 due to the switch signal from the control start determination unit 516n, if the condition becomes no longer satisfied in the control start determination unit 516n, the start side switch 516q switches from 1 to the control flag previous value. On this occasion, when the control end condition satisfaction signal is not output from the OR condition determination unit 516m, 1 is continuously output from the control flag switch 516s, and the control flag thus is in the ON state.

(Target Drive Wheel Speed Calculation Processing)

Figure 10:
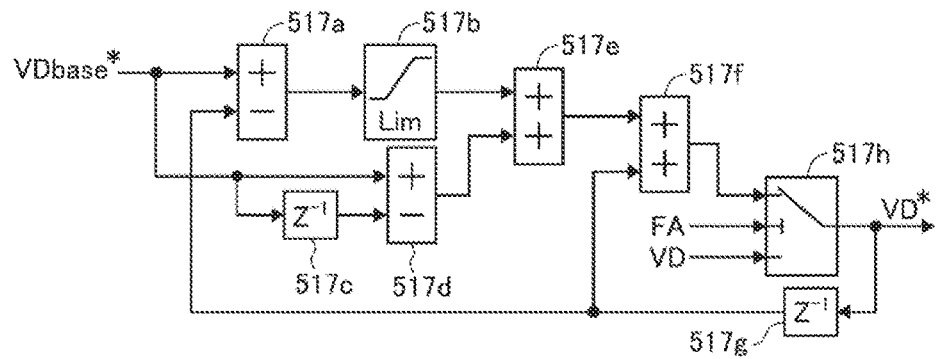
FIG. 10 is a control block diagram for illustrating target drive wheel speed calculation processing according to the first embodiment.

A target drive wheel speed calculation unit 517 calculates a target drive wheel speed VD* based on the target drive wheel speed reference value VDbase*. FIG. 10 is a control block diagram for illustrating target drive wheel speed calculation processing according to the first embodiment. Note that, in a state before the start of the slip control, the drive wheel speed VD is set as an initial value of the target drive wheel speed VD*. A target value deviation calculation unit 517a calculates a target value deviation between the target drive wheel speed reference value VDbase* and a previous target drive wheel speed VD* calculated by a target drive wheel speed previous value calculation unit 517g. A limiter 517b carries out limit processing for imposing a restriction on the deviation in order to attain a smooth torque change, and outputs the processed deviation to a first addition unit 517e. Moreover, a change amount calculation unit 517d calculates a change amount from a difference between a previous target drive wheel speed reference value VDbase*, which is output from a previous value output unit 517c configured to output a previous value of the target drive wheel speed reference value VDbase*, and a current target drive wheel speed reference value VDbase*, and outputs the change amount to the first addition unit 517e.

The first addition unit 517e adds the target value deviation and the change amount of the target drive wheel speed reference value VDbase* to each other, thereby calculating a change amount of the drive wheel speed to be changed in the control for this time. As a result, after the slip control starts, even when the target drive wheel speed reference value VDbase* makes a change exceeding the limit of the limiter 517b, the target drive wheel speed VD* can follow the target drive wheel speed reference value VDbase*. A second addition unit 517f adds the value output from the first addition unit 517e to the previous target drive wheel speed VD*, thereby calculating a primary target drive wheel speed, and outputs the primary target drive wheel speed to a target drive wheel speed changeover switch 517h. When the acceleration slip control flag FA is 0, the target drive wheel speed changeover switch 517h outputs the drive wheel speed VD as a final target drive wheel speed VD*, and, when the acceleration slip control flag FA is 1, outputs the primary target drive wheel speed as the final target drive wheel speed VD*.

(Acceleration Slip Control Torque Command Value Calculation Processing)

Figure 11:
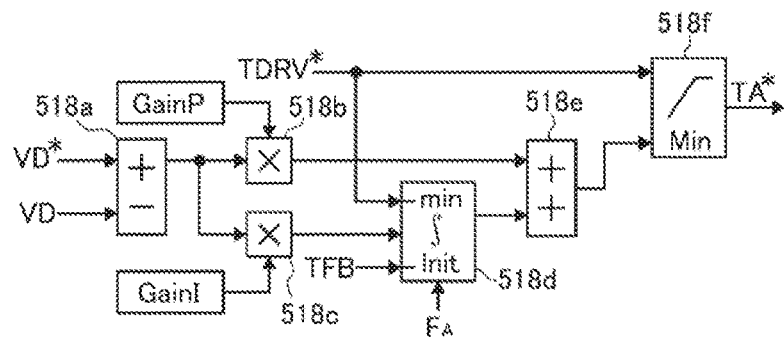
FIG. 11 is a control block diagram for illustrating acceleration slip control torque calculation processing according to the first embodiment.

An acceleration slip control torque command value calculation unit 518 calculates an acceleration slip control torque command value based on a deviation between the drive wheel speed VD and the target drive wheel speed VD*. FIG. 11 is a control block diagram for illustrating acceleration slip control torque calculation processing according to the first embodiment. A speed deviation calculation unit 518a calculates a speed deviation between the target drive wheel speed VD* and the drive wheel speed VD. A proportional gain multiplication unit 518b multiplies the speed deviation by a proportional gain Kp, thereby outputting a proportional component. An integral gain multiplication unit 518c multiples the speed deviation by an integral gain Ki. An integration unit 518d outputs, as an integral component, smaller one of an integral using the final torque command value TFB as an initial value and the driver request torque command value TDRV*. A PI control amount calculation unit 518e adds the proportional component and the integral component to each other, thereby outputting a PI control torque command value. An acceleration slip control torque command determination unit 518f outputs, as a final acceleration slip control torque command value TA*, smaller one of the driver request torque command value TDRV* and the PI control torque command value. Note that, an initial value of the target drive wheel speed VD* is the drive wheel speed VD, and hence the proportional component is zero, and the integral component is also set to the final torque command value TFB. The deviation is thus not generated immediately after the control start, and hence a torque fluctuation is not caused.

(Slip Control Torque Command Value Calculation Processing)

Figure 12:
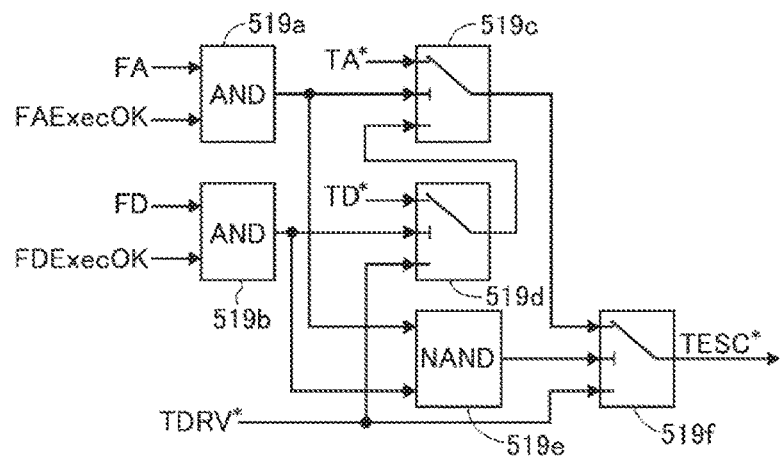
FIG. 12 is a control block diagram for illustrating slip control torque command value calculation processing according to the first embodiment.

A slip control torque command value calculation unit 519 selects, based on signals such as the acceleration slip control flag FA and the deceleration slip control flag FD, any one of the slip control torque command value TA* and the driver request torque command value TDRV*, thereby outputting a final slip control torque command value TESC*. FIG. 12 is a control block diagram for illustrating slip control torque command value calculation processing according to the first embodiment. An acceleration slip control execution permission flag FAExecOK and a deceleration slip control execution permission flag FDExecOK are respectively execution permission flags for the slip control. In a regeneration inhibition state, when a slip control off switch is depressed, or when a certain abnormality (such as a wheel speed sensor abnormality) is detected, the slip control is inhibited, and otherwise is permitted. When both the acceleration slip control flag FA and the acceleration slip control execution permission flag FAExecOK satisfy the conditions, an acceleration side AND determination unit 519a outputs a switch signal to an acceleration slip control torque command value changeover switch 519c and a NAND determination unit 519e. Similarly, when both the deceleration slip control flag FD and the deceleration slip control execution permission flag FDExecOK satisfy the conditions, a deceleration side AND determination unit 519b outputs a switch signal to a deceleration slip control torque command value changeover switch 519d and the NAND determination unit 519e. Note that, the NAND determination unit 519e is configured to determine, when the acceleration slip control flag FA and the deceleration slip control flag FD are simultaneously satisfied, that there is an abnormality, to thereby carry out processing so as not to follow the slip control request but to output the driver request torque command value TDRV*.

When the acceleration slip control request is output from the acceleration side AND determination unit 519a, a first torque command value changeover switch 519c switches the signal (TD* or TDRV*), which is output from the second torque command value changeover switch 519d, to the acceleration slip control torque command value TA*, thereby outputting the acceleration slip control torque command value TA* to a slip control torque command value calculation unit 519f. When the acceleration slip control request is not output, the first torque command value changeover switch 519c outputs the signal output from the second torque command value changeover switch 519d. When the deceleration slip control request is output from the deceleration side AND determination unit 519b, the second torque command value changeover switch 519d switches from the driver request torque command value TDRV* to the deceleration slip control torque command value TD*, thereby outputting the deceleration slip control torque command value TD* to the first torque command value changeover switch 519c, and when the deceleration slip control request is not output, the second torque command value changeover switch 519d outputs the driver request torque command value TDRV* to the first torque command value changeover switch 519c. When the NAND determination unit 519e makes the abnormality determination, the slip control torque command value calculation unit 519f outputs the driver request torque command value TDRV* as the slip control torque command value TESC*, and when the abnormality determination is not made, the slip control torque command value calculation unit 519f outputs the signal output from the first torque command value changeover switch 519c, as the slip control torque command value TESC*.

(Effect Acquired by Slip Control Improved in Responsiveness)

A description is now given of an effect in the slip control acquired by the above-mentioned control configuration. FIG. 16 are time charts for illustrating a relationship between the number of rotations and a torque when the drive slip control is carried out. FIG. 16(a) is a time chart when the configuration of the first embodiment is employed, FIG. 16(b) is a time chart when the configuration of the comparative example of FIG. 3 is employed, and when the control gain is set high, and FIG. 16(c) is a time chart when the configuration of the comparative example of FIG. 3 is employed, and when the control gain is set low. As illustrated in FIG. 16(a), when the drive slip is generated while the driver request torque command value TDRV* is output, the acceleration slip control flag FA is set to 1, and the acceleration slip control torque command value TA* is output so that the drive wheel speed VD converges to the target drive wheel speed VD*. On this occasion, by the configuration of the first embodiment, the acceleration slip control torque command value TA* is directly output from the traction control unit 51 of the brake controller 50 to the motor controller 100 without passing through the vehicle controller 110, and it is understood that the drive wheel speed VD appropriately converges to the target drive wheel speed VD* without a response delay. Moreover, even when such a μ change that the road surface suddenly becomes a frozen road during the travel and the road surface friction coefficient rapidly decreases occurs, the traction control extremely high in the convergence is also realized by the good responsiveness, and it is considered that such a point that the cornering force can be secured due to the good convergence is a fact to be particularly mentioned.

In contrast, in the comparative example of FIG. 16(b), even if the traction control is started after the drive wheel speed VD exceeds the target drive wheel speed VD*, a large overshoot is generated by the response delay. Further, even when the motor torque is decreased in order to converge the overshoot in the number of rotations, the traction control presents an oscillational behavior, and a period is required until the convergence. Moreover, when the μ change occurs, the traction control also presents an oscillational behavior, resulting in a bad convergence. As a solution to the problem of FIG. 16(b), as illustrated in FIG. 16(c), it is conceivable to set the control gain low, thereby suppressing the oscillational behavior. In this case, the oscillational behavior of the control is suppressed, but the period until the drive wheel speed VD converges to the target drive wheel speed VD* is long. During this period, the state in which the slip amount is large continues, and hence a sufficient traction cannot be transmitted between the tire and the road surface. Further, the cornering force also tends to decrease, and a vehicle stability cannot be said to be sufficient. In other words, the extremely large difference in the convergence is generated by the direct command to the motor controller 100 as in the first embodiment. When the vehicle according to the first embodiment actually travels on a frozen road or the like, this effect can provide stability that exceeds stability imagined by desk study, and that a driver has never experienced before.

(Vibration Suppression Control Restriction Value)

A description is now given of a problem regarding the vibration suppression control torque restriction value. As described before, the motor controller 100 includes the vibration suppression control unit 104 so as to apply the vibration suppression control torque for suppressing the high-frequency vibration generated in the powertrain system. On this occasion, a description is given of a reason for applying the vibration suppression control torque. In general, when the driver intends an operation such as the start, the acceleration, or the deceleration, and accordingly operates the accelerator pedal or the brake pedal to express a travel intention, the torque is output from the electric motor 2 in accordance with the intention so that the drive forces are transmitted from the drive wheels to the road surface, or the braking forces are transmitted from the road surface to the drive wheels, resulting in the travel of the vehicle. The driver surely expects a vehicle behavior good in the responsiveness, but a large vehicle inertia exists, and it can be thus said that the driver expects the responsiveness based on the vehicle inertia. Note that, a resonance frequency corresponding to a natural frequency of the large vehicle inertia can be said to belong to a low-frequency area.

On the other hand, the powertrain system of the vehicle has a natural frequency corresponding to an inertia (hereinafter referred to as inertia of the powertrain system) of the electric motor 2, the drive shafts 4, and the drive wheels. A resonance frequency corresponding to this natural frequency belongs to a higher frequency area than the resonance frequency of the vehicle, and a torque fluctuation at a high frequency is recognized as uncomfortable vibration and sound by the driver, and causes a degradation in the drivability. Thus, the vibration suppression control unit 104 focuses on the fluctuation component of the number of motor rotations, and applies the vibration suppression control torque for suppressing the vibration component in the high-frequency area of the fluctuation component to suppress the vibration.

In other words, when the drive wheel is traveling in a grip state, the inertia acting on the powertrain system is the vehicle inertia. Therefore, the resonance frequency causing the vibration is low, and thus little vibration suppression control torque is required. However, when the drive wheel is traveling in the slip state, the acting inertia is the inertia of the powertrain system. Therefore, the resonance frequency is high, which causes a high-frequency torque fluctuation. Thus, a large vibration suppression control torque is required.

On this occasion, upon the vehicle start, or when the friction force (torque) between the drive wheel and the road surface changes abruptly, even when the drive wheel is in the grip state, a frequency upon the abrupt change is recognized as a fluctuation in the number of motor rotations on the high frequency side, which requires the vibration suppression control, and the vibration suppression control torque for suppressing this fluctuation is applied by mistake. Then, even when the actual relationship between the drive wheel and the road surface is in the grip state, and the vibration suppression control torque is thus not necessary because the vehicle inertia is acting, a large vibration suppression control torque is applied, which causes such a fear that the output torque of the electric motor 2 is excessively suppressed. This means that the output of the drive force is reduced upon the driving, and the output of the braking force is reduced upon the braking.

Thus, how to apply the vibration suppression control torque is changed depending on conditions such as whether the travel state is to be considered based on the inertia of the powertrain system or the travel state is to be considered based on the vehicle inertia. Specifically, for the travel state to be considered based on the vehicle inertia, even when the vibration suppression control torque is calculated, the vibration suppression control torque restriction value is decreased so that the actually applied value decreases, and, for the travel state to be considered based on the inertia of the powertrain system, the vibration suppression control torque restriction value is increased so that the actually applied vibration suppression control torque is sufficiently applied.

Figure 17:
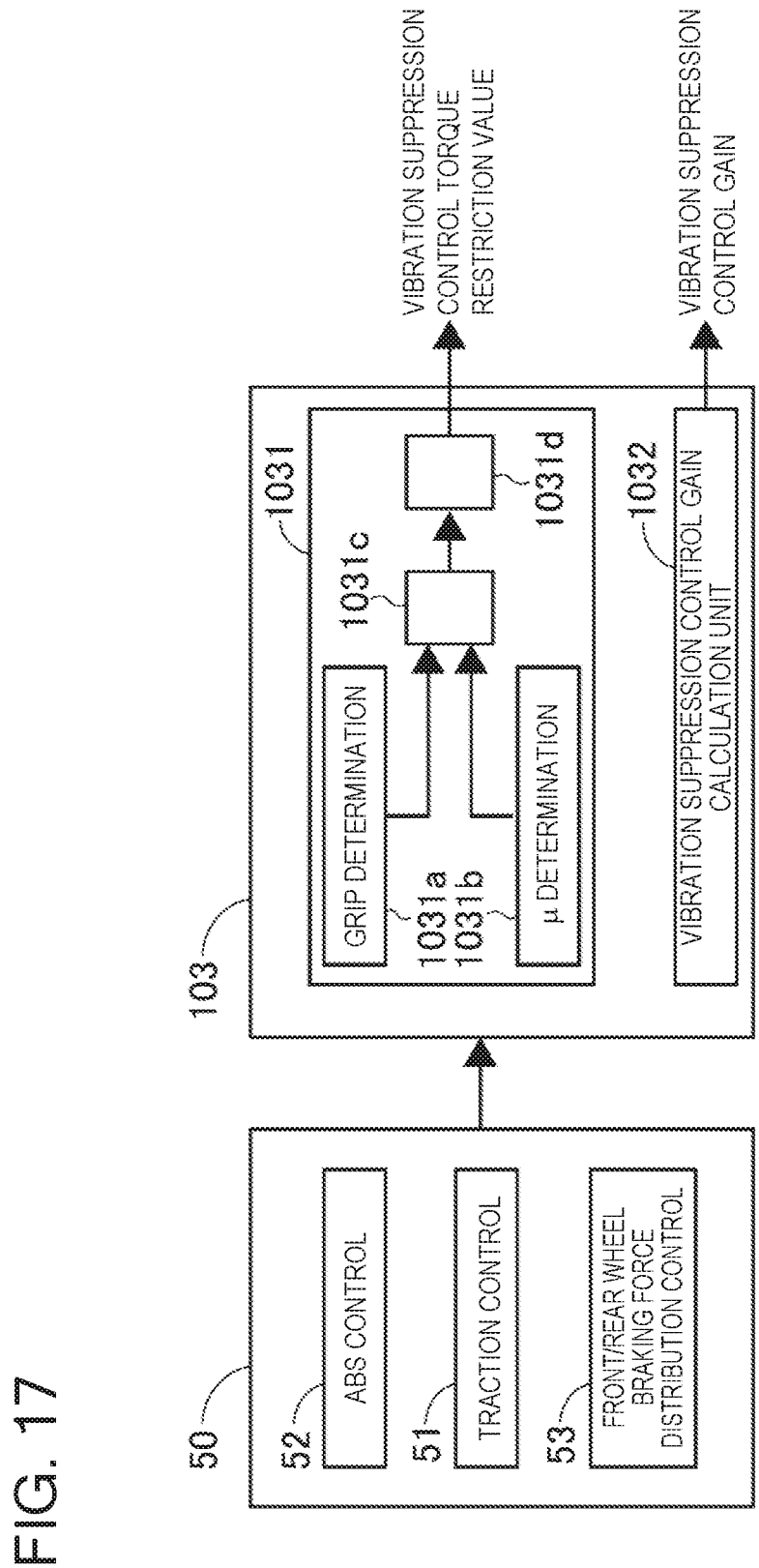
FIG. 17 is a control block diagram for illustrating vibration suppression control restriction value calculation processing according to the first embodiment.

A description is now given of specific vibration suppression control restriction value calculation processing to be carried out in the vibration suppression control information calculation unit 103. FIG. 17 is a control block diagram for illustrating the vibration suppression control restriction value calculation processing according to the first embodiment. The brake controller 50 includes, in addition to the above-mentioned traction control unit 51, an ABS control unit 52 configured to carry out antilock brake control for avoiding a braking lock of the wheel, and a front/rear wheel braking force distribution control unit 53 configured to control a braking force distribution depending on loads on the front/rear wheels. The ABS control unit 52 monitors the slip state of the wheel, and, when the wheel enters a predetermined slip state, decreases a wheel cylinder pressure, thereby avoiding the lock. Moreover, for example, when the load moves to the front wheel side upon the deceleration, and the load on the rear wheel side decreases, the front/rear wheel braking force distribution control unit 53 controls (mainly depressurizes) the wheel cylinder pressure on the rear wheel side so that the difference in the wheel speed between the front wheel side and the rear wheel side is in a predetermined range, thereby avoiding a decrease in the cornering force caused by the lock tendency on the rear wheel side. The brake controller 50 outputs flag information representing the control state of the respective control units, grip information representing the slip states of the wheels, the vehicle body acceleration GC information, and the like to the vibration suppression control information calculation unit 103. Based on these pieces of information, it is determined whether the current state is the state to be considered based on the vehicle inertia or the state to be considered based on the inertia of the powertrain system.

The vibration suppression control information calculation unit 103 includes a vibration suppression control restriction value calculation unit 1031 configured to calculate the vibration suppression control restriction value, and a vibration suppression control gain calculation unit 1032 configured to calculate a vibration suppression control gain. The vibration suppression control restriction value calculation unit 1031 includes a grip determination unit 1031a configured to determine the grip state of the drive wheel, a μ determination unit 1031b configured to estimate a road surface friction coefficient, a restriction value setting unit 1031c configured to determine TL or TH (>TL) as the vibration suppression control torque restriction value, based on the determination result by the grip determination unit 1031a and the determination result by the μ determination unit 1031b, and a change amount restriction unit 1031d configured to impose a restriction on a change amount of the set restriction value, and then output a final vibration suppression control torque restriction value.

The grip determination unit 1031a determines the grip state based on various pieces of information received from the brake controller 50. For example, when the acceleration slip control flag FA is ON, the grip determination unit 1031a determines that the state is the slip state, and when the acceleration slip control flag FA is OFF, the grip determination unit 1031a determines that the state is the grip state. Note that, a difference between the drive wheel speed VD and the estimated vehicle body speed VC may be calculated, and when the difference is equal to or more than a predetermined value, the state may be determined to be the slip state, while when the difference is less than the predetermined value, the state may be determined to be the grip state, or the determination may be made based on other control flag information. The μ determination unit 1031b estimates a road surface friction coefficient μ based on a relationship between the current vehicle body acceleration GC and the slip state of the wheel. For example, when the vehicle body acceleration GC is equal to or more than a predetermined value, and the slip ratio of the wheel is less than a predetermined value, μ is determined to be high, and when the vehicle body acceleration GS is less than the predetermined value, and the slip ratio of the wheel is equal to or more than the predetermined value, μ is determined to be low. Note that, when a logic of estimating the road surface friction coefficient exists in the respective control units in the brake controller 50, whether μ is high or low may be determined based on the estimated road surface friction coefficient. Moreover, μ is determined to be whether high or low in the first embodiment, but the road surface friction coefficient may more finely be estimated.

The restriction value setting unit 1031c sets the vibration suppression control torque restriction value, based on the grip state of the drive wheel and the road surface friction coefficient. FIG. 18 is a table for showing set values for the vibration suppression control torque restriction value according to the first embodiment. When the state is determined to be the grip state, and μ is determined to be high, the smaller value TL is set as the restriction value. FIG. 19 is a time chart at the time of start when TL is set as the vibration suppression control torque restriction value according to the first embodiment. At a time point t1, at the time of start on a high μ road, a torque rise frequency of the electric motor 2 is included in the high-frequency area subject to the suppression by means of the vibration suppression control, and, at a time point t2, the torque is calculated by the vibration suppression control. On this occasion, the rise is only the torque rise upon the start, and the inertia of the vehicle only needs to be considered, but if the rise is considered as the generation of the high-frequency vibration, and the vibration suppression control torque is directly output, the motor torque is excessively suppressed, and a decrease in a travel start performance is caused. Thus, by setting the restriction value to TL, and carrying out control so that a torque larger than TL in the absolute value is prevented from being output as the vibration suppression control torque, excessive addition/subtraction of the motor torque to/from the driver request torque TDRV* are restricted, and a good travel start performance can be secured.

Moreover, even in the grip state, on a low μ road, the state is likely to transition to the slip state, and, in this case, the set value of the vibration suppression control torque restriction value is set to the larger value TH in advance. Moreover, when the state is determined to be the slip state, the set value is set to TH regardless of the road surface friction coefficient. Note that, when the set value is changed from TL to TH, a sense of discomfort caused by the abrupt change in the restriction value is resolved by imposing such a restriction that the set value changes at a predetermined change amount in the change amount restriction unit 1031d.

Figure 20:
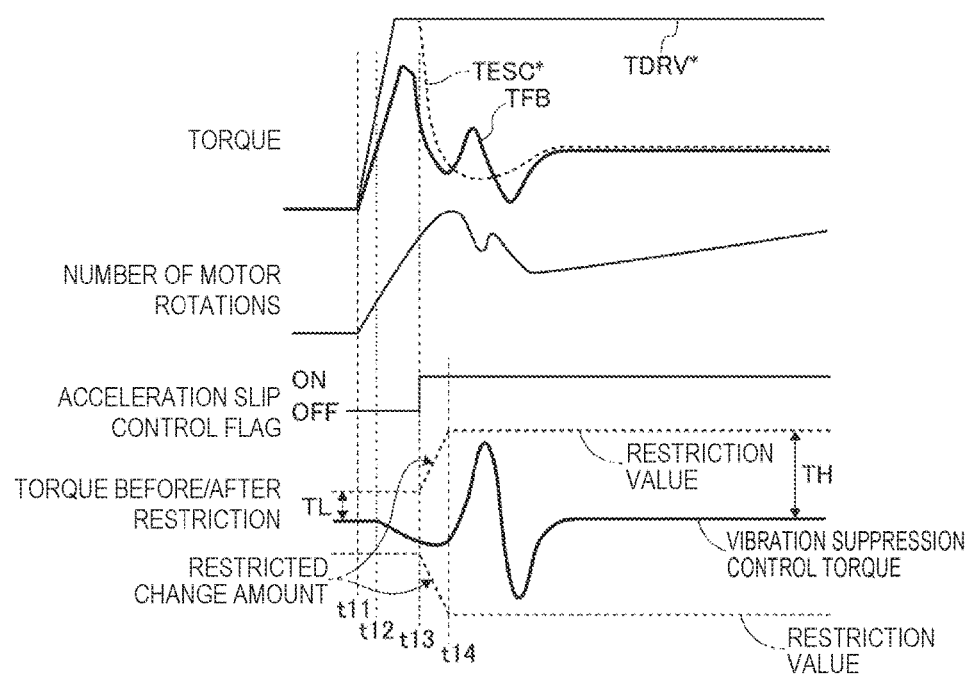
FIG. 20 is a time chart at the time of start when TL is changed to TH as the vibration suppression control torque restriction value according to the first embodiment.

FIG. 20 is a time chart at the time of the start when TL is changed to TH as the vibration suppression control torque restriction value according to the first embodiment. At a time point t11, at the time of the start on the high μ road, a torque rise frequency of the electric motor 2 is included in the high-frequency area subject to the suppression by means of the vibration suppression control, and, at a time point t12, the torque is calculated by the vibration suppression control. On this occasion, the state is not the slip state, and the vibration suppression control torque restriction value is thus set to TL. At a time point t13, when a slip is generated on the drive wheel, and the acceleration slip control flag FA becomes ON, the slip control torque command value TESC* is calculated, and the driver request torque TDRV* is switched to the slip control torque command value TESC*. Further, the vibration suppression control torque restriction value is changed from TL to TH, and is changed with the predetermined change amount over a predetermined period from the time point t13 to a time point t14. Thus, the vibration suppression control torque restriction value does not abruptly change, and even when a large vibration suppression control torque is calculated in the period from t13 to t14, an excessive change in the motor torque is avoided, and a stable travel state is secured. After the time point t14, when the state enters the slip state, and the powertrain system resonates, a large vibration suppression control torque is calculated. On this occasion, the vibration suppression control torque restriction value has been changed to the larger value TH, and thus a sufficient vibration restriction control torque can be applied.

[Effects of First Embodiment]

Effects provided by the device for controlling an electric vehicle according to the first embodiment are now listed.

(1) There is provided a device for controlling an electric vehicle, including: an electric motor 2 configured to generate a torque for braking or driving a drive wheel; a wheel speed sensor 9 (drive wheel speed detection unit) configured to detect a rotational speed of the drive wheel; a vehicle body speed estimation unit 512 (vehicle body speed calculation unit) configured to calculate an estimated vehicle body speed VC (vehicle body speed of the vehicle); a grip determination unit 1031a and a μ determination unit 1031b (travel state calculation unit) configured to calculate a travel state based on a state of the drive wheel during a travel; a driver request torque calculation unit 111 (torque command value calculation unit) configured to calculate a driver request torque (first torque command value) directed to the electric motor 2 based on an accelerator operation or a brake operation by a driver, and output the calculated driver request torque to the electric motor 2; a vibration suppression control unit 104 (vibration suppression control torque calculation unit) configured to calculate, in order to suppress a vibration component caused by a resonance of the vehicle, a vibration suppression control torque command value directed to the electric motor 2, and output the calculated vibration suppression control torque command value to the motor; a motor controller 100 (motor control unit) configured to control the electric motor 2 based on the command values of the driver request torque calculation unit 111 and the vibration suppression control unit 104; and a vibration suppression control gain/restriction value calculation unit 103 (vibration suppression control torque command value restriction unit) configured to restrict the vibration suppression control torque command value depending on a calculation result by the grip determination unit 1031a and the μ determination unit 1031b. In other words, the inertia of the powertrain system changes depending on the state of the drive wheel. Therefore, by restricting the vibration suppression control torque command value depending on the state of the drive wheel, the generation of the vibration can be effectively suppressed while the travel performance is secured.

(2) The vibration suppression control gain/restriction value calculation unit 103 provides a device for controlling an electric vehicle that restricts an absolute value of the vibration suppression control torque command value. Thus, even when a positive value or a negative value is calculated as the vibration suppression control torque, the restricted vibration suppression control torque is applied in any one of the cases, and the travel performance can thus be secured.

(3) The vibration suppression control gain/restriction value calculation unit 103 provides a device for controlling an electric vehicle that restricts a change amount per unit time in a restriction value so as to have a predetermined gradient. Thus, an abrupt change in the restriction value is suppressed, and an abrupt change in the vibration suppression control torque command value can be avoided.

(4) The vibration suppression control gain/restriction value calculation unit 103 provides a device for controlling an electric vehicle that restricts, when the grip determination unit 1031a and the µ determination unit 1031b determine that the drive wheel is in a grip state or that a road surface friction coefficient is high, the vibration suppression control torque command value to be smaller than that when the grip determination unit 1031a and the µ determination unit 1031b determine that the drive wheel is in a slip state or that the road surface friction coefficient is low. Thus, the excessive addition/subtraction of the motor torque to/from the driver request torque TDRV* are restricted, and a good travel start performance can thus be secured.

(5) The grip determination unit 1031a and the µ determination unit 1031b provides a device for controlling an electric vehicle that calculates the travel state based on whether or not ABS control (antilock brake control), traction control, or front/rear wheel braking force distribution control is active. In other words, the travel performance and the vibration suppression performance can simultaneously be secured by referring to the control state activated by the increase in the slip ratio.

(6), The vibration suppression control gain/restriction value calculation unit 103 provides a device for controlling an electric vehicle that restricts the vibration suppression control torque command value more when the ABS control, the traction control, or the front/rear wheel distribution control is not active than when the ABS control, the traction control, or the front/rear wheel distribution control is active. In other words, when the slip ratio is increasing, the inertia of the powertrain system is small and a vibration tends to be generated. The vibration suppression control can thus effectively be carried out by sufficiently applying the vibration suppression control torque. When the state is the grip state small in the slip ratio, the state can be considered based on the inertia of the vehicle, and thus the vibration is less liable to be generated. The travel performance can thus be secured by suppressing the vibration suppression control torque.

(7) The µ determination unit 1031b provides a device for controlling an electric vehicle that calculates a state of a road surface friction coefficient during the travel, based on the state of the drive wheel, and when the calculated road surface friction coefficient is high, the vibration suppression control torque command value is restricted more than when the calculated road surface friction is low. In other words, when µ is low, the state in which the slip ratio tends to increase is obtained. In this case, the inertia of the powertrain system is small and a vibration tends to be generated. The vibration suppression control can thus be effectively carried out by sufficiently applying the vibration suppression control torque. When µ is high, the state in which the slip ratio is less liable to increase is obtained. In this case, the state can be considered based on the inertia of the vehicle, and thus the vibration is less liable to be generated. The travel performance can thus be secured by suppressing the vibration suppression control torque.

Examples of the technological idea that may be acquired from the embodiment are now listed.

(1) There is provided a device for controlling an electric vehicle, including: a motor configured to generate a torque for braking or driving a drive wheel; a drive wheel speed detection unit configured to detect a rotational speed of the drive wheel; a vehicle body speed calculation unit configured to calculate a vehicle body speed of the vehicle; a travel state calculation unit configured to calculate a travel state based on a state of the drive wheel during a travel; a torque command value calculation unit configured to calculate, based on an accelerator operation or a brake operation by a driver, a driver request torque (first torque command value) directed to the motor, and output the calculated driver request torque to the motor; a vibration suppression control torque calculation unit configured to calculate, in order to suppress a vibration component caused by a resonance of the electric vehicle, a vibration suppression control torque command value directed to the motor, and output the calculated vibration suppression control torque command value to the motor; a motor control unit configured to control the motor based on the command values of the torque command value calculation unit and the vibration suppression control torque calculation unit; and a vibration suppression control torque command value restriction unit configured to restrict the vibration suppression control torque command value depending on a calculation result by the travel state calculation unit.

(2) In the device for controlling an electric vehicle according to Item (1), the vibration suppression control torque command value restriction unit is configured to restrict an absolute value of the torque command value.

(3) In the device for controlling an electric vehicle according to Item (2), the vibration suppression control torque command value restriction unit is configured to restrict, when the travel state determination unit determines that the drive wheel is in a grip state or that a road surface friction coefficient is high, the vibration suppression control torque command value to be smaller than the vibration suppression control torque command value set when the travel state determination unit determines that the drive wheel is in a slip state or that the road surface friction coefficient is low.

(4) In the device for controlling an electric vehicle according to Item (1), the vibration suppression control torque command value restriction unit is configured to restrict a change amount per unit time in a restriction value so as to have a predetermined gradient.

(5) In the device for controlling an electric vehicle according to Item (1), the travel state calculation unit is configured to calculate the travel state based on whether or not antilock brake control, traction control, or front/rear wheel braking force distribution control is active.

(5') In the device for controlling an electric vehicle according to Item (1), the vibration suppression control torque command value restriction unit is configured to restrict, when the travel state determination unit determines that the drive wheel is in a grip state or that a road surface friction coefficient is high, the vibration suppression control torque command value to be smaller than the vibration suppression control torque command value set when the travel state determination unit determines that the drive wheel is in a slip state or that the road surface friction coefficient is low.

(6) In the device for controlling an electric vehicle according to Item (5), the vibration suppression control torque command value restriction unit is configured to restrict the vibration suppression control torque command value more when the antilock brake control, the traction control, or the front/rear wheel distribution control is not activated by the travel state calculation unit than when the antilock brake control, the traction control, or the front/rear wheel distribution control is active.

(7) In the device for controlling an electric vehicle according to Item (6), the vibration suppression control torque command value restriction unit is configured to restrict an absolute value of the vibration suppression control torque command value.

(8) In the device for controlling an electric vehicle according to Item (6), the vibration suppression control torque command value restriction unit is configured to restrict a change amount per unit time in a restriction value.

(9) In the device for controlling an electric vehicle according to Item (1), the travel state calculation unit is configured to calculate a state of a road surface friction coefficient during the travel, based on the state of the drive wheel, and when the calculated road surface friction coefficient is high, the vibration suppression control torque command value is restricted more than when the calculated road surface friction coefficient is low.

(10) In the device for controlling an electric vehicle according to Item (9), the vibration suppression control torque command value restriction unit is configured to restrict an absolute value of a torque command value.

(11) In the device for controlling an electric vehicle according to Item (9), the vibration suppression control torque command value restriction unit is configured to restrict a change amount per unit time in a restriction value so as to have a predetermined gradient.

(12) There is provided a device for controlling an electric vehicle, including: a motor configured to generate a torque for braking or driving a drive wheel; a drive wheel speed detection unit configured to detect a rotational speed of the drive wheel; a vehicle body speed calculation unit configured to calculate a vehicle body speed of the vehicle; a slip state determination unit configured to determine, based on the calculated vehicle body speed and a detected drive wheel speed, whether a state of the drive wheel is a grip state or a slip state, or a road surface friction coefficient calculation unit configured to calculate a road surface friction coefficient during a travel; a torque command value calculation unit configured to calculate a torque command value directed to the motor based on an accelerator operation or a brake operation by a driver, and output the calculated torque command value to the motor; a vibration suppression control torque calculation unit configured to calculate, in order to suppress a vibration component caused by a resonance of the electric vehicle, a vibration suppression control torque command value directed to the motor, and output the calculated vibration suppression control torque command value to the motor; a motor control unit configured to control the motor based on the command values of the torque command value calculation unit and the vibration suppression control torque calculation unit; and a vibration suppression control torque command value restriction unit configured to restrict a magnitude of the vibration suppression control torque command value, depending on a determination result by the slip state determination unit or the road surface friction coefficient.

(13) In the device for controlling an electric vehicle according to Item (12), the vibration suppression control torque command value restriction unit is configured to restrict, when the slip state determination unit determines that the drive wheel is in the grip state or when the road surface friction coefficient calculation unit determines that the road surface friction coefficient is high, the vibration suppression control torque command value to be smaller than the vibration suppression control torque command value set when the slip state determination unit determines that the drive wheel is in the slip state or when the road surface friction coefficient calculation unit determines that the road surface friction coefficient is low.

(14) In the device for controlling an electric vehicle according to Item (12), the slip state determination unit is configured to determine the slip state based on whether or not antilock brake control, traction control, or front/rear wheel braking force distribution control is active.

(15) In the device for controlling an electric vehicle according to Item (14), the vibration suppression control torque command value restriction unit is configured to restrict an absolute value of the torque command value.

(16) In the device for controlling an electric vehicle according to Item (15), the vibration suppression control torque command value restriction unit is configured to restrict a change amount per unit time in a restriction value until the restricted torque command value is reached, so as to have a predetermined gradient.

(17) There is provided a method of controlling an electric vehicle, including: controlling a motor configured to generate a torque for braking or driving a drive wheel, based on a torque command value based on an accelerator operation or a brake operation by a driver and a vibration suppression control torque command value for suppressing a vibration component caused by a resonance of the electric vehicle; and restricting, when the drive wheel is in a grip state, the vibration suppression control torque command value more than when the drive wheel is determined to be in a slip state.

(18) In the method of controlling an electric vehicle according to Item (17), the restricting of the vibration suppression control torque command value is carried out so as to decrease the vibration suppression control torque command value in an absolute value.

(19) The method of controlling an electric vehicle according to Item (18) further includes restricting a change amount per unit time in a restriction value until the restricted torque command value is reduced so as to have a predetermined gradient.

(20) The method of controlling an electric vehicle according to Item (17) further includes determining a slip of the drive wheel as the slip state when antilock brake control, traction control, or front/rear wheel braking force distribution control is active.

According to the embodiment, the inertia to be treated by the powertrain system changes depending on the state of the drive wheel. Thus, by restricting the vibration suppression control torque command value depending on the state of the drive wheel, the generation of the vibration can be effectively suppressed while the travel performance is secured.

A description has been given of only some embodiments of the present invention, but it is readily understood by a person skilled in the art that various changes and improvements can be made to the exemplified embodiment without practically departing from the novel teachings and advantages of the present invention. Thus, forms to which such changes and improvements are made are also intended to be included in the technical scope of the present invention.

The present application claims a priority based on Japanese Patent Application No. 2013-188972 filed on Sep. 12, 2013. All disclosed contents including Specification, Claims, Drawings, and Abstract of Japanese Patent Application No. 2013-188972 filed on Sep. 12, 2013 are incorporated herein by reference in their entirety.

All disclosures including Specification, Claims, Drawings, and Abstract of Japanese Patent Application Laid-open No. 2000-125410 (Patent Literature 1) are incorporated herein by reference in their entirety.

REFERENCE SIGNS LIST 1 electric motor
2 resolver
3 differential gear
3a speed reduction mechanism
4 drive shaft
5 hydraulic unit
5a hydraulic pipe
6 high-voltage battery
7 converter
8 accessory battery
9 wheel speed sensor
10 inverter
20 power steering controller
21 steering angle sensor
22 meter controller
50 brake controller
51 traction control unit
60 battery controller
100 motor controller
101 changeover switch
103 vibration suppression control information calculation unit
104 vibration suppression control unit
105 motor current control unit
110 vehicle controller
111 driver request torque calculation unit
511 drive wheel speed calculation unit
512 vehicle body speed estimation unit
513 target drive wheel speed reference value calculation unit
514 acceleration slip control start speed calculation unit
515 acceleration slip control end speed calculation unit
516 acceleration slip control flag calculation unit
517 target drive wheel speed calculation unit
518 acceleration slip control torque command value calculation unit
519 slip control torque command value calculation unit
CAN1 first CAN bus
CAN2 second CAN bus
CAN3 first connection bus
FAExecOK acceleration slip control execution permission flag
FA acceleration slip control flag
FDExecOK deceleration slip control execution permission flag
FD deceleration slip control flag
FH ESC state flag
W/C wheel cylinder

The invention claimed is:

1. A device for controlling an electric vehicle including a motor configured to generate a torque for braking or driving a drive wheel and a drive wheel speed sensor configured to detect a rotational speed of the drive wheel, the device comprising:
a controller configured to:
calculate a vehicle body speed of the vehicle;
calculate a travel state based on a state of the drive wheel during travel;
calculate a driver request torque command value directed to the motor based on an accelerator operation or a brake operation by a driver, and output the calculated driver request torque command value to the motor;
calculate, in order to suppress a vibration component caused by a resonance of the vehicle, a vibration suppression control torque command value directed to the motor, and output the calculated vibration suppression control torque command value to the motor;
control the motor based on the driver request torque command value and the vibration suppression control torque command value; and
set, when it is determined as the travel state that the drive wheel is in a grip state or that a road surface friction coefficient is equal to or higher than a predetermined value, a limit value of the vibration suppression control torque command value to be smaller than when it is determined as the travel state that the drive wheel is in a slip state or that the road surface friction coefficient is lower than the predetermined value,
wherein the controller is further configured to calculate the travel state based on whether or not antilock brake control, traction control, or front/rear wheel braking force distribution control is active, and
wherein the controller is further configured to set the limit to a smaller value when the antilock brake control, the traction control, or the front/rear wheel braking force distribution control is not activated than when the antilock brake control, the traction control, or the front/rear wheel braking force distribution control is active.

2. The device for controlling the electric vehicle according to claim 1, wherein the controller is further configured to set, as the limit value, an absolute value of the vibration suppression control torque command value.

3. The device for controlling the electric vehicle according to claim 1, wherein the controller is further configured to set the limit value such that a change amount per unit time with respect to the limit value has a gradient equal to or smaller than a predetermined gradient.

4. The device for controlling the electric vehicle according to claim 1, wherein the controller is further configured to set, as the limit value, an absolute value of the vibration suppression control torque command value.

5. The device for controlling the electric vehicle according to claim 1, wherein the controller is further configured to restrict a change amount per unit time with respect to the limit value.

6. The device for controlling the electric vehicle according to claim 1, wherein the controller is further configured to calculate a state of the road surface friction coefficient during the travel, based on the state of the drive wheel.

7. The device for controlling the electric vehicle according to claim 1, wherein the resonance is a resonance frequency corresponding to a natural frequency of a powertrain of the vehicle.

8. The device for controlling the electric vehicle according to claim 1, wherein the controller is further configured to control the motor based on a final torque command value obtained by adding the vibration suppression control torque command value to the driver request torque command value.

* * * * *